(12) United States Patent
Fazlollahi Ghomshi et al.

(10) Patent No.: US 11,512,850 B2
(45) Date of Patent: Nov. 29, 2022

(54) DOUBLE SWIRL BURNER

(71) Applicants: Alireza Fazlollahi Ghomshi, Tehran (IR); Saeed Azizabadi Farahani, Tehran (IR); Masoud Eidi Attarzadeh, Tehran (IR); Sadegh Tabejamaat, Tehran (IR)

(72) Inventors: Alireza Fazlollahi Ghomshi, Tehran (IR); Saeed Azizabadi Farahani, Tehran (IR); Masoud Eidi Attarzadeh, Tehran (IR); Sadegh Tabejamaat, Tehran (IR)

( * ) Notice: Subject to any disclaimer, the term of this patent is extended or adjusted under 35 U.S.C. 154(b) by 575 days.

(21) Appl. No.: 16/672,443

(22) Filed: Nov. 2, 2019

(65) Prior Publication Data
US 2020/0063957 A1 Feb. 27, 2020

Related U.S. Application Data

(60) Provisional application No. 62/755,430, filed on Nov. 3, 2018.

(51) Int. Cl.
| | |
|---|---|
| *F23C 7/00* | (2006.01) |
| *F23D 14/24* | (2006.01) |
| *F23D 14/58* | (2006.01) |
| *F23D 14/60* | (2006.01) |
| *G05B 19/4155* | (2006.01) |
| *F23N 5/18* | (2006.01) |

(52) U.S. Cl.
CPC .............. *F23C 7/002* (2013.01); *F23C 7/008* (2013.01); *F23D 14/24* (2013.01); *F23D 14/58* (2013.01); *F23D 14/60* (2013.01); *F23N 5/187* (2013.01); *G05B 19/4155* (2013.01); *F23N 2223/04* (2020.01); *F23N 2223/08* (2020.01); *F23N 2235/06* (2020.01); *F23N 2235/16* (2020.01); *G05B 2219/50199* (2013.01)

(58) Field of Classification Search
CPC .......... F23C 7/002; F23C 7/008; F23D 14/24; F23D 14/58; F23D 14/60; F23N 5/187
USPC .............................. 431/182, 185, 9; 700/283
See application file for complete search history.

(56) References Cited

U.S. PATENT DOCUMENTS

| | | | |
|---|---|---|---|
| 2011/0139048 A1* | 6/2011 | Tamura | F23C 7/004 110/262 |
| 2020/0080720 A1* | 3/2020 | Cates | F23D 14/84 |

* cited by examiner

*Primary Examiner* — Vivek K Shirsat
(74) *Attorney, Agent, or Firm* — Bajwa IP Law Firm; Haris Zaheer Bajwa

(57) ABSTRACT

A double swirl burner including an annular air nozzle, an annular fuel nozzle coaxially disposed within the annular air nozzle, and a central air nozzle coaxially disposed within the annular fuel nozzle. An annular air nozzle may include at least one first inlet port on a peripheral wall of the annular air nozzle, where the first inlet port may be configured to allow for tangentially injecting a first air stream into the annular air nozzle. A first air stream may be tangent to a circular cross-section of the exemplary annular air nozzle, and a first axial inlet that may be configured to allow for axially injecting a second air stream into the annular air nozzle along a centerline of the annular air nozzle.

20 Claims, 18 Drawing Sheets

70

```
┌─────────────────────────────────────────┐
│ Injecting a first airstream into an     │
│ annular air nozzle, the first stream    │
│ injected tangential to a circular       │
│ cross-section of the annular air nozzle │
└─────────────────────────────────────────┘
                    │
                    ▼                        ──── 702

┌─────────────────────────────────────────┐
│ Injecting a second air stream into the  │
│ annular air nozzle, the second air      │
│ stream injected axially along a         │
│ centerline of the annular air nozzle    │
└─────────────────────────────────────────┘
                    │
                    ▼                        ──── 704

┌─────────────────────────────────────────┐
│ Injecting a fuel stream into an annular │
│ fuel nozzle disposed coaxially within   │
│ the annular air nozzle, the fuel stream │
│ injected axially along a centerline of  │
│ the annular fuel nozzle                 │
└─────────────────────────────────────────┘
                    │
                    ▼                        ──── 706

┌─────────────────────────────────────────┐
│ Injecting a third airstream into a      │
│ central air nozzle coaxially disposed   │
│ within the annular fuel nozzle, the     │
│ third stream injected tangential to a   │
│ circular cross-section of the central   │
│ air nozzle                              │
└─────────────────────────────────────────┘
                    │
                    ▼                        ──── 708

┌─────────────────────────────────────────┐
│ Injecting a fourth air stream into the  │
│ central air nozzle, the fourth air      │
│ stream injected axially along a         │
│ centerline of the central nozzle        │
└─────────────────────────────────────────┘
                                             ──── 710
```

FIG. 7

DOUBLE SWIRL BURNER

CROSS-REFERENCE TO RELATED APPLICATION

This application claims the benefit of priority from pending U.S. Provisional Patent Application Ser. No. 62/755,430, filed on Nov. 3, 2018, and entitled "JET ASSIST DOUBLE SWIRL BURNER," which is incorporated herein by reference in its entirety.

TECHNICAL FIELD

The present disclosure relates to combustion chambers and particularly relates to swirl burners. More particularly, the present disclosure is related to a double swirl burner and a method for operating a double swirl burner.

BACKGROUND

The current design of combustion systems is driven by the need for increased power density, improved fuel efficiency, reduced life-cycle costs, and reduced environmental impact due to NOx emissions. Various technologies have been developed to address the abovementioned needs, especially to control Nox emissions. These technologies include, but are not limited to, air staging, exhaust gas recirculation, and fuel staging. In the air staging approach, air is introduced into a combustion system in stages.

One way to implement air staging is by utilizing swirl combustion. Swirl combustion allows for increased fuel and oxidizer mixing and reduced local flame temperatures that may lead to higher combustion efficiencies and lower NOx emissions. In gas turbine applications and industrial burners, swirl flow is usually generated utilizing geometric swirl generators, such as guide vanes that are generally designed with invariable geometries. These geometric swirl generators are only capable of generating a specific swirl number. The swirl number, which is defined as a ratio of a tangential momentum to an axial momentum of swirl flow, is dependent on blade or vane angles of these geometric swirl generators as well as a mass flow rate of an airstream entering these geometric swirl generators.

Double annulus swirl burners may also be utilized for combustion. These double annulus swirl burners may allow for controlling a radial distribution of flow and the swirl number to achieve stable flames. The double annulus swirl burners may utilize geometric swirl generators in the annuluses to generate either co-swirling or counter-swirling airstreams within the two annuluses. As mentioned before, utilizing geometric swirl generators may limit the capability of changing the swirl number within the two annuluses; therefore, there is a need for a double swirl burner that may utilize aerodynamic swirl generators. These aerodynamic swirl generators may utilize axial and tangential airstreams to generate swirl flow. Accordingly, the swirl number for these aerodynamic swirl generators may be controlled by tuning a ratio of tangential and axial mass flowrates.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a double swirl burner that may include an annular air nozzle, an annular fuel nozzle coaxially disposed within the annular air nozzle, and a central air nozzle coaxially disposed within the annular fuel nozzle. An exemplary annular air nozzle may include at least one exemplary first inlet port on a peripheral wall of the annular air nozzle, where the exemplary first inlet port may be configured to allow for tangentially injecting a first air stream into the exemplary annular air nozzle. An exemplary first air stream may be tangent to a circular cross-section of the exemplary annular air nozzle, and an exemplary first axial inlet that may be configured to allow for axially injecting a second air stream into the exemplary annular air nozzle along a centerline of the exemplary annular air nozzle.

In an exemplary embodiment, an exemplary central air nozzle may include at least one exemplary second inlet port on a peripheral wall of the central air nozzle, where the exemplary second inlet port may be configured to allow for tangentially injecting a third air stream into the exemplary central air nozzle. An exemplary third air stream may be tangent to a circular cross-section of the exemplary central air nozzle, and an exemplary second axial inlet that may be configured to allow for axially injecting a fourth air stream into the exemplary central air nozzle along a centerline of the exemplary central air nozzle.

In an exemplary embodiment, an exemplary annular fuel nozzle may include an axial fuel inlet that may be configured to allow for axially injecting a fuel stream along a centerline of the exemplary annular fuel nozzle.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 illustrates a flowchart of a method for operating a double swirl burner, consistent with one or more exemplary embodiments of the present disclosure.

DETAILED DESCRIPTION

Figure 1A:
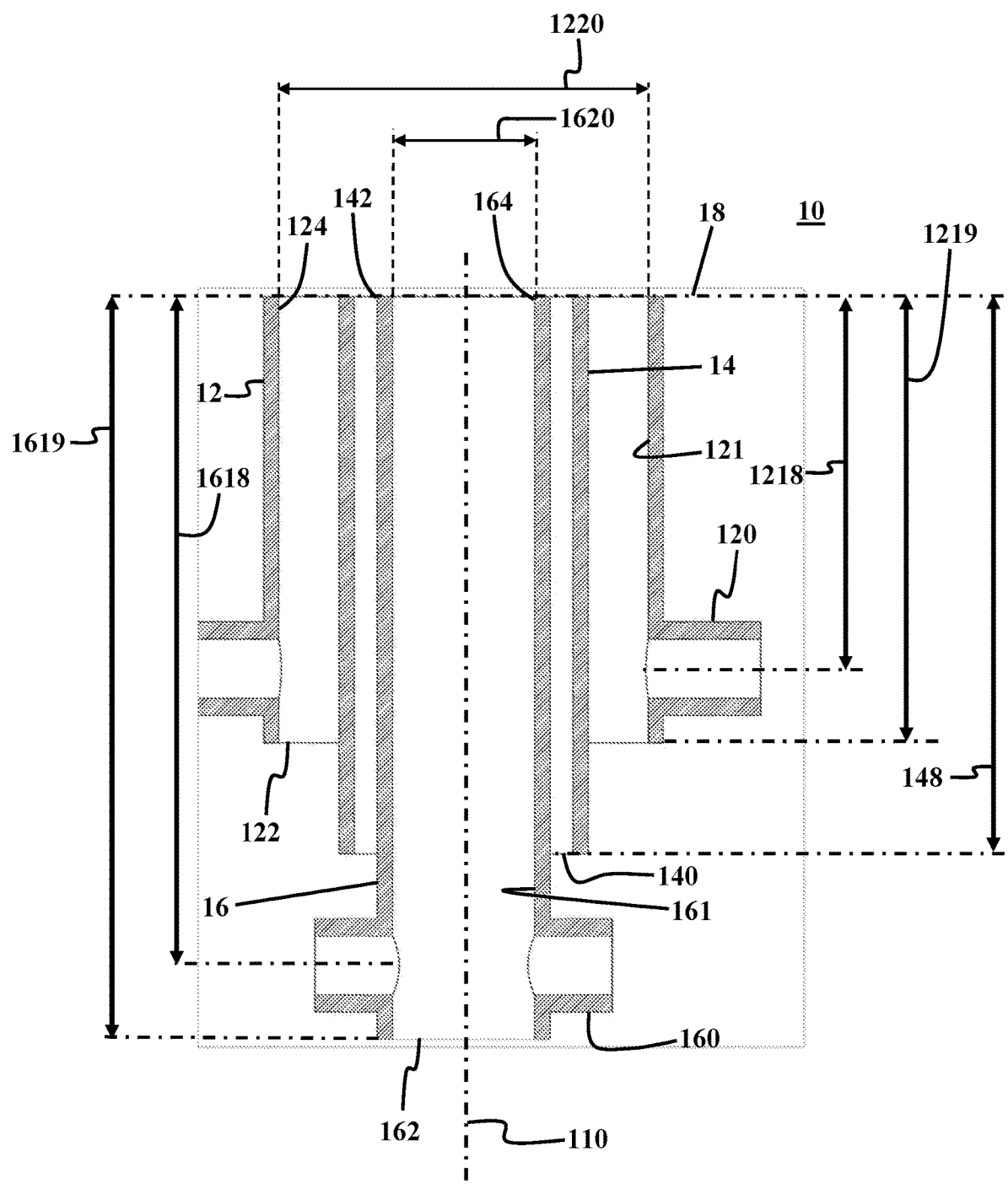
FIGS. 1A and 1B illustrate sectional side-views of a double swirl burner, consistent with one or more exemplary embodiments of the present disclosure.

In the following detailed description, numerous specific details are set forth by way of examples to provide a thorough understanding of the relevant teachings related to the exemplary embodiments. However, it should be apparent that the present teachings may be practiced without such details. In other instances, well-known methods, procedures, components, and circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be plain to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The present disclosure is directed to exemplary embodiments of a double swirl burner that may include two separate concentric air nozzles, namely, an annular air nozzle and a central air nozzle. An exemplary double swirl burner may utilize aerodynamic swirl generators for generating swirling air streams within an exemplary annular air nozzle and an exemplary central air nozzle. In an exemplary double swirl burner, fuel may be injected utilizing an annular fuel nozzle between an envelope defined by the two swirling airstreams. An exemplary fuel nozzle may be coaxially disposed between an exemplary annular air nozzle and an exemplary central air nozzle.

Each of the exemplary aerodynamic swirl generators may include several tangential air jets and an axial air jet. This combination of axial and tangential flow within an exemplary aerodynamic swirl generator may allow for generating a swirling stream of air with a controlled swirl intensity or swirl number. Swirl intensity of an exemplary swirling flow of air within an exemplary aerodynamic swirl generator may be controlled by changing a ratio between a mass flow rate of the tangential and axial air jets. An exemplary double swirl burner, therefore, may allow for tuning a first swirl number within an exemplary annular air nozzle and a second swirl number within a central air nozzle. In exemplary embodiments, such control over the swirl numbers within the two air nozzles may allow for tuning flame structures generated at an exit plane of an exemplary double swirl burner. Tuning the flame structures may lead to higher levels of efficiency and lower NOx emissions. In other words, an exemplary double swirl burner may allow for achieving an optimized flame (Highest efficiency and lowest emissions) by tuning the swirl intensity or number within an exemplary annular air nozzle and an exemplary central air nozzle. As used herein, tuning may refer to changing mass flowrates of tangential and axial fluid flows within each of an exemplary annular air nozzle and an exemplary central air nozzle.

Figure 1B:
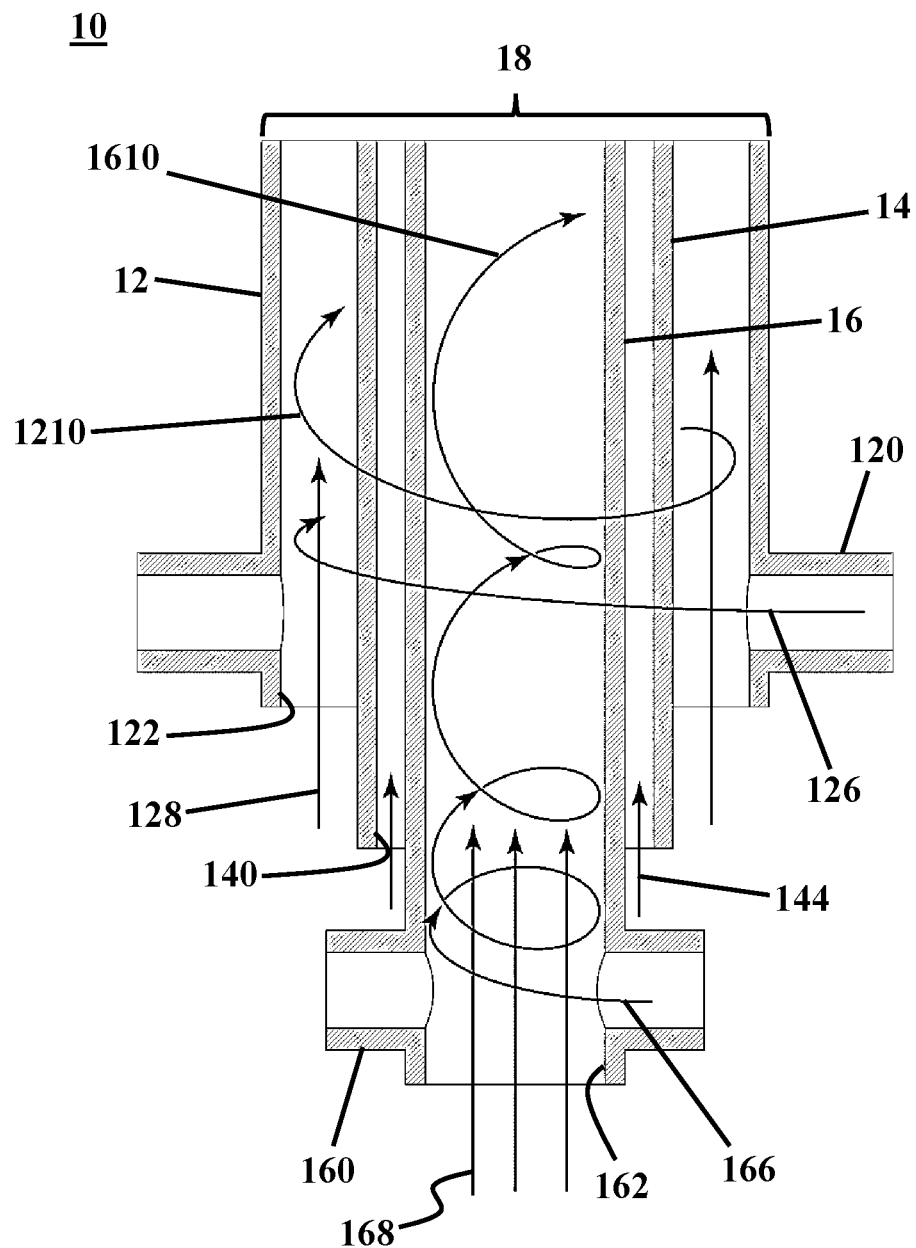

FIGS. 1A and 1B illustrate sectional side-views of a double swirl burner 10, consistent with one or more exemplary embodiments of the present disclosure. In an exemplary embodiment, double swirl burner 10 may include an annular air nozzle 12, an annular fuel nozzle 14 that may be coaxially disposed within annular air nozzle 12, and a central air nozzle 16 that may be coaxially disposed within annular fuel nozzle 14. In an exemplary embodiment, annular air nozzle 12 and central air nozzle 16 may be configured to allow for discharging swirling streams of air at an exit plane 18 of double swirl burner 10. In an exemplary embodiment, annular fuel nozzle 14 may be configured to allow for discharging a fuel stream at exit plane 18 of double swirl burner 10.

In an exemplary embodiment, annular air nozzle 12 may include at least one first inlet port 120 that may open into annular air nozzle 12 through a peripheral wall 121 of annular air nozzle 12. In an exemplary embodiment, first inlet port 120 may be configured to allow for tangentially injecting a first airstream 126 into annular air nozzle 12. In exemplary embodiments, tangential injection of first airstream 126 may refer to injected first airstream 126 being tangent to a circular cross-section of annular air nozzle 12 such that a first swirling stream of air 1210 may be generated within annular air nozzle 12. In other words, first inlet port 120 may be configured to allow for injecting first airstream 126 into annular air nozzle 12 in a direction tangent to a circular cross-section of annular air nozzle 12. In an exemplary embodiment, such a tangential injection of first airstream 126 into annular air nozzle 12 may generate an upward swirling stream of air, which is referred to herein as first swirling stream of air 1210. First swirling stream of air 1210 may swirl upward around annular fuel nozzle 14 toward exit plane 18 of double swirl burner 10.

Figure 2A:
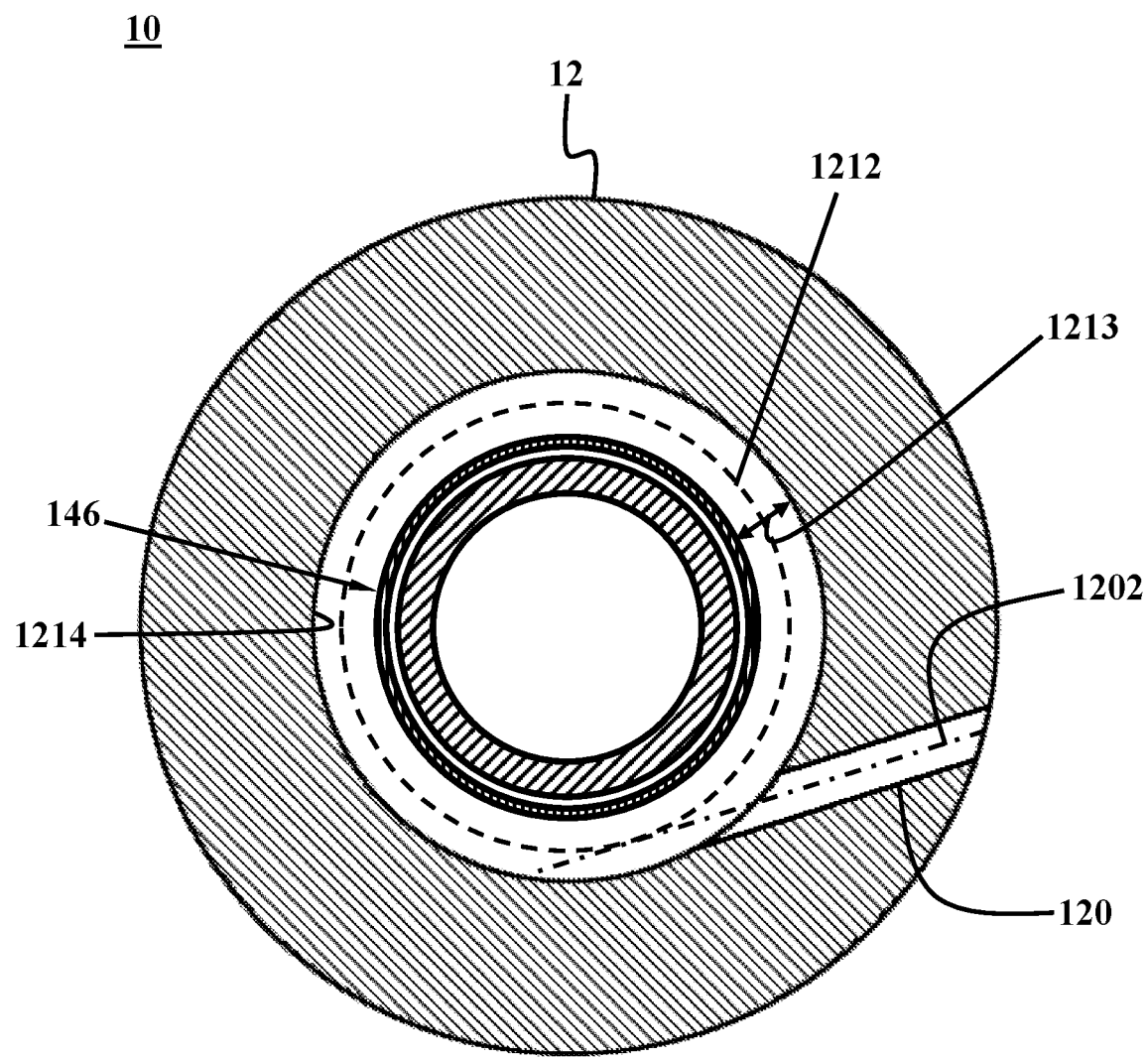
FIG. 2A illustrates a sectional top view of a double swirl burner, consistent with one or more exemplary embodiments of the present disclosure.

FIG. 2A illustrates a sectional top-view of double swirl burner 10, consistent with one or more exemplary embodiments of the present disclosure. In an exemplary embodiment, first inlet port 120 may open into annular air nozzle 12 through peripheral wall 121 of annular air nozzle 12. In an exemplary embodiment, first inlet port 120 may be oriented such that, when viewed from the top, a centerline 1202 of first inlet port 120 may be tangent to a first imaginary circle 1212, which may be concentric with annular air nozzle 12. In an exemplary embodiment, first imaginary circle 1212 may be radially equidistant from the circular cross-section of annular air nozzle 12 and a circular cross-section of annular fuel nozzle 14. In other words, first imaginary circle 1212 may represent an annular zone in the middle of a gap 1213 between an outer surface 146 of annular fuel nozzle 14 and an inner surface 1214 of annular air nozzle 12. Accordingly, first imaginary circle 1212 may be a locus of a point that may be moved to be equidistant from outer surface 146 of annular fuel nozzle 14 and inner surface 1214 of annular air nozzle 12. In exemplary embodiments, such orientation of first inlet port 120 with respect to annular air nozzle 12 may allow for tangentially injecting first airstream 126 into annular air nozzle 12.

Figure 2B:
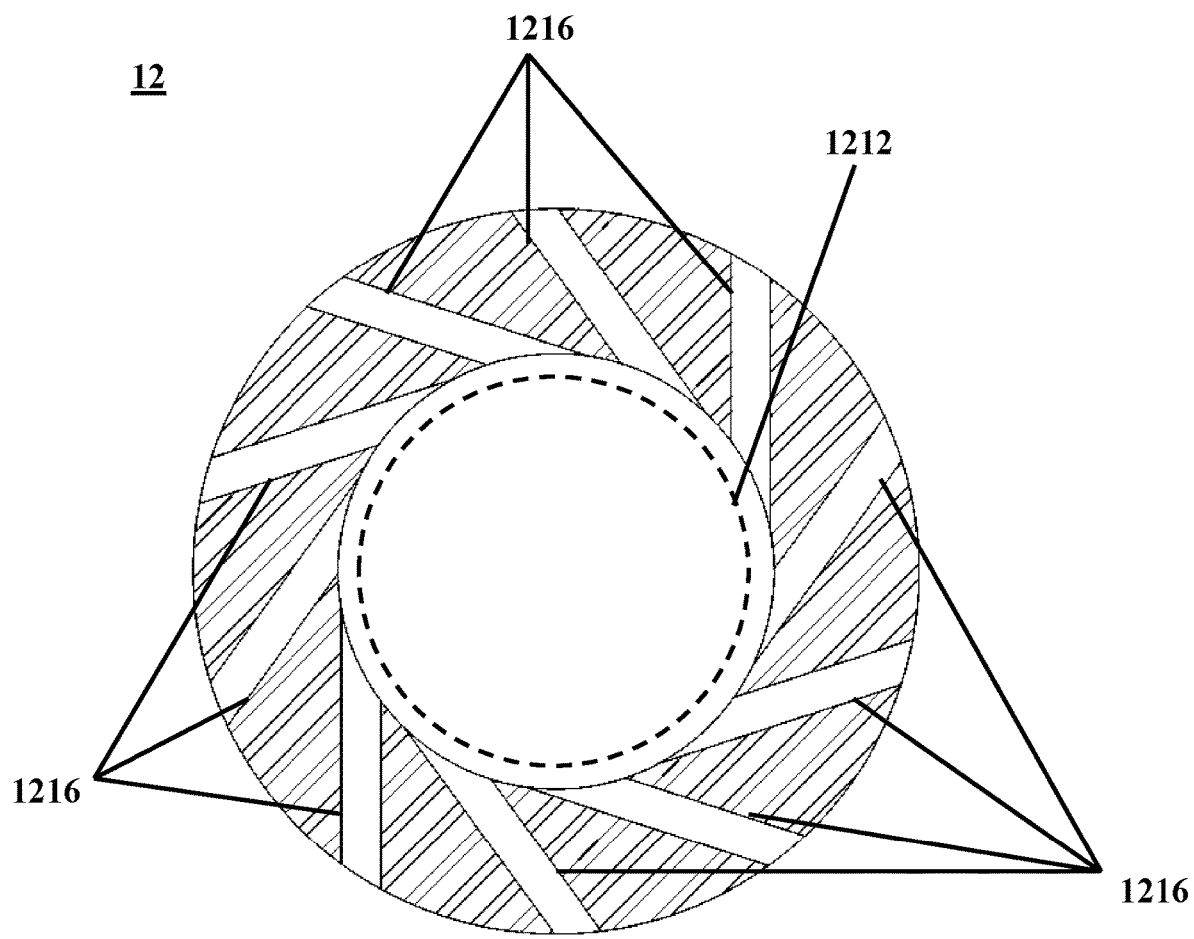
FIG. 2B illustrates a sectional top view of an annular air nozzle, consistent with one or more exemplary embodiments of the present disclosure.

FIG. 2B illustrates a sectional top-view of annular air nozzle 12, consistent with one or more exemplary embodiments of the present disclosure. In an exemplary embodiment, annular air nozzle 12 may include a first plurality of inlet ports 1216 that may be located on the periphery of annular air nozzle 12. In an exemplary embodiment, each of first plurality of inlet ports 1216 may be structured and orientated similar to first inlet port 120. In other words, each of first plurality of inlet ports 1216 may be oriented such that, when viewed from the top, a centerline 1202 of each of first plurality of inlet ports 1216 may be tangent to first imaginary circle 1212.

In an exemplary embodiment, first plurality of inlet ports 1216 may be equally spaced apart around the periphery of annular air nozzle 12 and may be configured to allow for tangentially injecting a plurality of airstreams into annular air nozzle 12. In an exemplary embodiment, such a tangential injection of the plurality of airstreams into annular air nozzle 12 may generate first swirling stream of air 1210 within annular air nozzle 12.

Referring again to FIGS. 1A and 1B, in an exemplary embodiment, annular air nozzle 12 may further include a first axial inlet 122 that may be configured to allow for axially injecting a second airstream 128 into annular air nozzle 12 along a centerline of annular air nozzle 12. In an exemplary embodiment, the centerline of annular air nozzle 12 may be superimposed on a central line 110 of double swirl burner 10. In an exemplary embodiment, first inlet port 120 may be located downstream of and adjacent to first axial inlet 122 with respect to a flow direction of second air stream 128. As used herein, a direction of travel from an inlet, for example, first axial inlet 122 along a flow direction. For example, the direction of second airstream 128 is considered downstream.

In an exemplary embodiment, first inlet port 120 may fluidically connect an interior of annular air nozzle 12 to a first air source, and first axial inlet 122 may fluidically connect an interior of annular air nozzle 12 to a second air source. In an exemplary embodiment, the first air source may provide first airstream 126 with a first flow rate, and the second air source may provide second airstream 128 with a second flow rate. In exemplary embodiments, the first flow rate and the second flow rate may be adjustable. Swirl number in annular air nozzle 12 may be defined as a ratio of tangential momentum to axial momentum of airflow generated within annular air nozzle 12. Accordingly, in exemplary embodiments, the swirl number in annular air nozzle 12 may be changed by adjusting the ratio between the first flow rate and the second flow rate. In other words, the first flow rate of first airstream 126 that may be injected through first inlet port 120 may be manipulated to adjust a radial component of the airflow momentum within annular air nozzle 12, while the second flow rate of second airstream 128 that may be injected through first axial inlet 122 may be manipulated to adjust an axial component of the airflow momentum within annular air nozzle 12. As used herein, manipulating the first flow rate and the second flowrate may refer to changing the amounts of the first and the second flow rates utilizing control valves, flow controllers, and other similar instruments capable of changing a mass flow rate of a stream provided by a source. Such capability of adjusting the swirl number in annular air nozzle 12 by manipulating the first and the second flow rates may allow for changing flame structure of double swirl burner 10.

In an exemplary embodiment, annular air nozzle 12 may further include a first axial air outlet 124 that may allow for discharging first swirling stream of air 1210 through exit plane 18 of double swirl burner 10. In an exemplary embodiment, first inlet port 120 may be located at a distance 1218 of 48 mm to 72 mm upstream of first axial air outlet 124.

In an exemplary embodiment, central air nozzle 16 may include at least one second inlet port 160 that may open into central air nozzle 16 through a peripheral wall 161 of central air nozzle 16. In an exemplary embodiment, second inlet port 160 may be configured to allow for tangentially injecting a third airstream 166 into central air nozzle 16. In exemplary embodiments, tangential injection of third airstream 166 may refer to injected third airstream 166 being tangent to a circular cross-section of central air nozzle 16 such that a second swirling stream of air 1610 may be generated within central air nozzle 16. In other words, second inlet port 160 may be configured to allow for injecting third airstream 166 into central air nozzle 16 in a direction tangent to a circular cross-section of central air nozzle 16. In exemplary embodiments, such a tangential injection of third airstream 166 into central air nozzle 16 may generate an upward swirling stream of air, which was referred to herein as second swirling stream of air 1610. Second swirling stream of air 1610 may swirl upward within central air nozzle 16 toward exit plane 18 of double swirl burner 10.

Figure 3A:
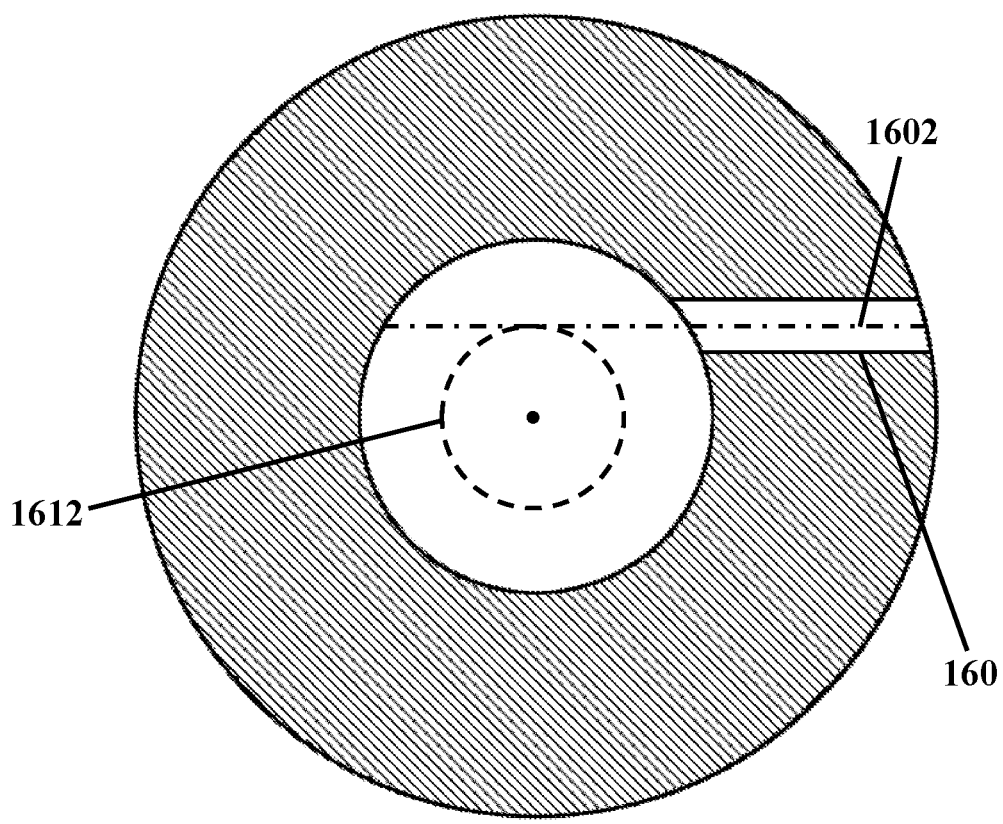
FIGS. 3A and 3B illustrate sectional top-views of a central air nozzle, consistent with one or more exemplary embodiments of the present disclosure.
Figure 3B:
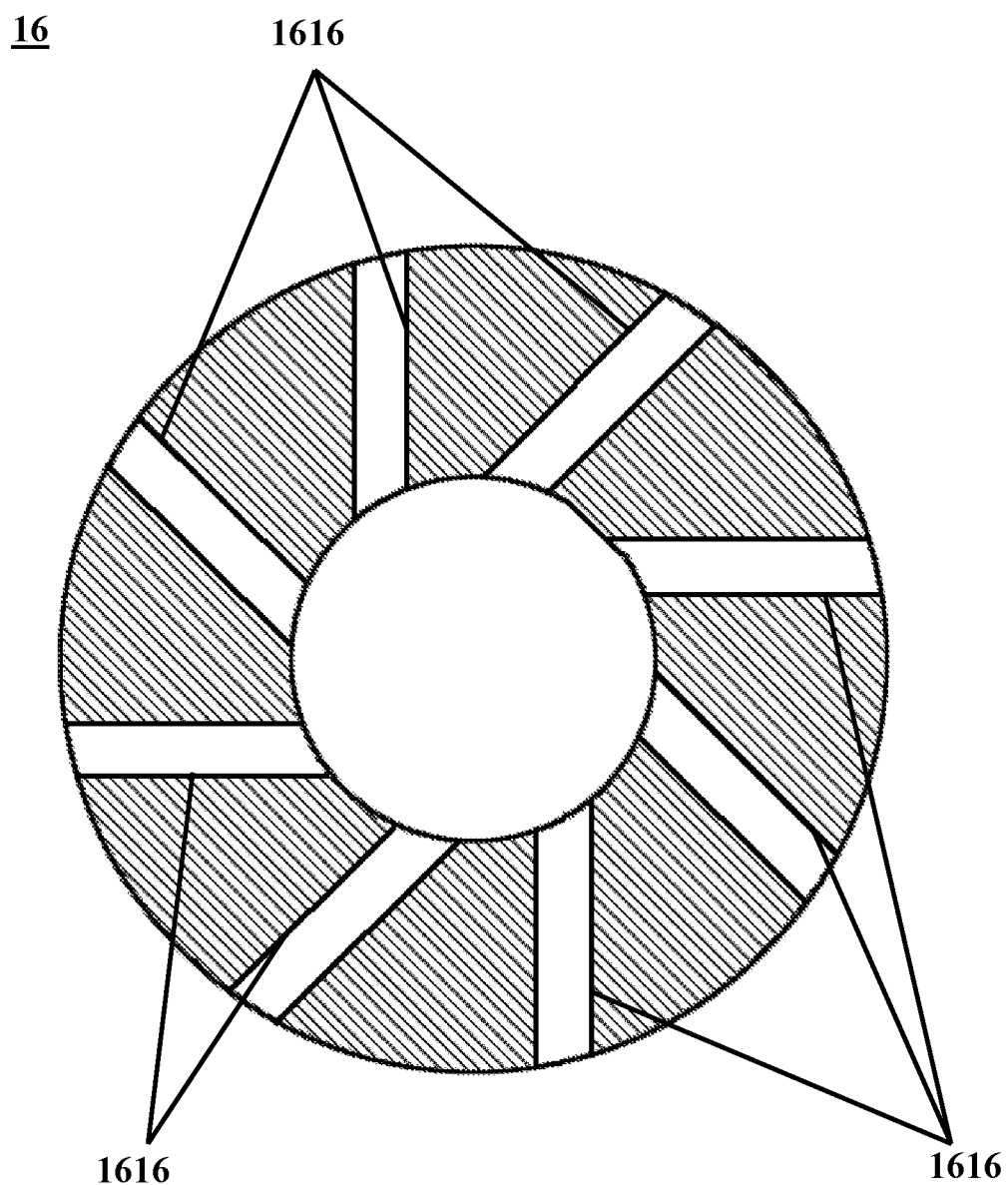

FIGS. 3A and 3B illustrate sectional top-views of central air nozzle 16, consistent with one or more exemplary embodiments of the present disclosure. In an exemplary embodiment, second inlet port 160 may open into central air nozzle 16 through peripheral wall 161 of central air nozzle 16. In an exemplary embodiment, second inlet port 160 may be oriented such that, when viewed from the top, a centerline 1602 of second inlet port 160 may be tangent to a second imaginary circle 1612. Second imaginary circle 1612 may be concentric with central air nozzle 16 and may represent an annular zone in the middle of central air nozzle 16. In an exemplary embodiment, second imaginary circle 1612 may have a diameter of about half the diameter of the circular cross-section of central air nozzle 16.

Referring to FIG. 3B, in an exemplary embodiment, central air nozzle 16 may include a second plurality of inlet ports 1616 that may be located on the periphery of central air nozzle 16. In an exemplary embodiment, each of second plurality of inlet ports 1616 may be structured and orientated similar to second inlet port 160. In other words, each of second plurality of inlet ports 1616 may be oriented such that a centerline of each of second plurality of inlet ports 1616 may be tangent to an imaginary circle concentric with the circular cross-section of central air nozzle 16 with a diameter half the diameter of the circular cross-section of central air nozzle 16.

In an exemplary embodiment, second plurality of inlet ports 1616 may be equally spaced apart around the periphery of central air nozzle 16 and may be configured to allow for tangentially injecting a plurality of airstreams into central air nozzle 16. In an exemplary embodiment, such a tangential injection of the plurality of airstreams into central air nozzle 16 may generate second swirling stream of air 1610 within central air nozzle 16.

Referring to FIGS. 1A and 1B, in an exemplary embodiment, central air nozzle 16 may further include a second axial inlet 162 that may be configured to allow for axially injecting a fourth airstream 168 into central air nozzle 16 along a centerline of central air nozzle 16. In an exemplary embodiment, the centerline of central air nozzle 16 may be superimposed on a central line 110 of double swirl burner 10. In an exemplary embodiment, second inlet port 160 may be located downstream of and adjacent to second axial inlet 162 with respect to a flow direction of fourth airstream 168.

In an exemplary embodiment, second inlet port 160 may fluidically connect an interior of central air nozzle 16 to a third air source (not illustrated), and second axial inlet 162 may fluidically connect an interior of central air nozzle 16 to a fourth air source (not illustrated). In an exemplary embodiment, the third air source may provide third airstream 166 with a third flow rate, and the fourth air source may provide fourth airstream 168 with a fourth flow rate. In exemplary embodiments, the third flow rate and the fourth flow rate may be adjustable. Swirl number in central air nozzle 16 may be defined as a ratio of tangential momentum to axial momentum of airflow generated within central air nozzle 16. Accordingly, in exemplary embodiments, the swirl number in central air nozzle 16 may be adjusted by adjusting the ratio between the third flow rate and the fourth flow rate. In other words, the third flow rate of third airstream 166 that may be injected through second inlet port 160 may be manipulated to adjust a radial component of the airflow momentum within central air nozzle 16, while the fourth flow rate of fourth airstream 168 that may be injected through second axial inlet 162 may be manipulated to adjust an axial component of the airflow momentum within central air nozzle 16. As used herein, manipulating the third flow rate and the fourth flowrate may refer to changing the amounts of the third and the fourth flow rates utilizing control valves, flow controllers, and other similar instruments capable of changing a mass flow rate of a stream provided by a source. Such capability of adjusting the swirl number in central air nozzle 16 by manipulating the third and the fourth flow rates may allow for changing the flame structure of double swirl burner 10.

In an exemplary embodiment, central air nozzle 16 may further include a second axial air outlet 164 that may allow for discharging second swirling stream of air 1610 through exit plane 18 of double swirl burner 10. In an exemplary embodiment, second inlet port 160 may be located at a distance 1618 of 80 mm to 120 mm upstream of second axial air outlet 164.

In an exemplary embodiment, annular fuel nozzle 14 may include an axial fuel inlet 140 that may be configured to allow for injecting an axial fuel stream 144 into annular fuel nozzle 14 along a centerline of annular fuel nozzle 14. In an exemplary embodiment, the centerline of annular fuel nozzle 14 may be superimposed on a central line 110 of double swirl burner 10. In an exemplary embodiment, annular fuel nozzle 14 may further include an axial fuel outlet 142 that may be configured to allow for discharging axial fuel stream 144 through exit plane 18 of double swirl burner 10. In an exemplary embodiment, axial fuel inlet 140 may be at a distance 148 of 68 mm to 120 mm upstream of axial fuel outlet 142.

In an exemplary embodiment, axial fuel inlet 140 may be configured to allow for injecting an axial fuel stream 144 into annular fuel nozzle 14 from around central air nozzle 16 along a centerline of annular fuel nozzle 14. In other words, axial fuel stream 144 may be discharged through exit plane 18 of double swirl burner 10 between first swirling stream of air 1210 and second swirling stream of air 1610 that may be simultaneously discharged from first axial air outlet 124 and second axial air outlet 164, respectively.

In an exemplary embodiment, first axial air outlet 124, axial fuel outlet 142, and second axial air outlet 164 may lie flush against each other. In other words, exit planes of first axial air outlet 124, axial fuel outlet 142, and second axial air outlet 164 may be superimposed on exit plane 18 of double swirl burner 10.

Referring to FIG. 1A, in an exemplary embodiment, central air nozzle 16 may have a length 1619 to a diameter 1620 ratio of approximately between 4 and 6. In an exemplary embodiment, length 1619 may represent the length of central air nozzle 16 from second axial inlet 162 to second axial air outlet 164. In an exemplary embodiment, diameter 1620 may represent diameter of central air nozzle 16. For example, diameter 1620 may be approximately 20 mm, and length 1619 may be between 80 mm and 120 mm. In an exemplary embodiment, annular air nozzle 12 may have a length 1219 of approximately 60% of length 1619 of central air nozzle 16. For example, length 1619 may be between 80 mm and 120 mm, and length 1219 of annular air nozzle 12 may be between 48 mm and 72 mm. In an exemplary embodiment, a diameter 1220 of annular air nozzle 12 may be selected such that a cross-sectional air-passage area of annular air nozzle 12 may be equal to a cross-sectional area of central air nozzle 16. In an exemplary embodiment, Fuel nozzle 14 may have a length 148 which may be approximately 85% of length 1619 of central air nozzle 16. For example, length 1619 may be between 80 mm and 120 mm, and length 148 of fuel nozzle 14 may be between 68 mm and 102 mm.

Figure 4:
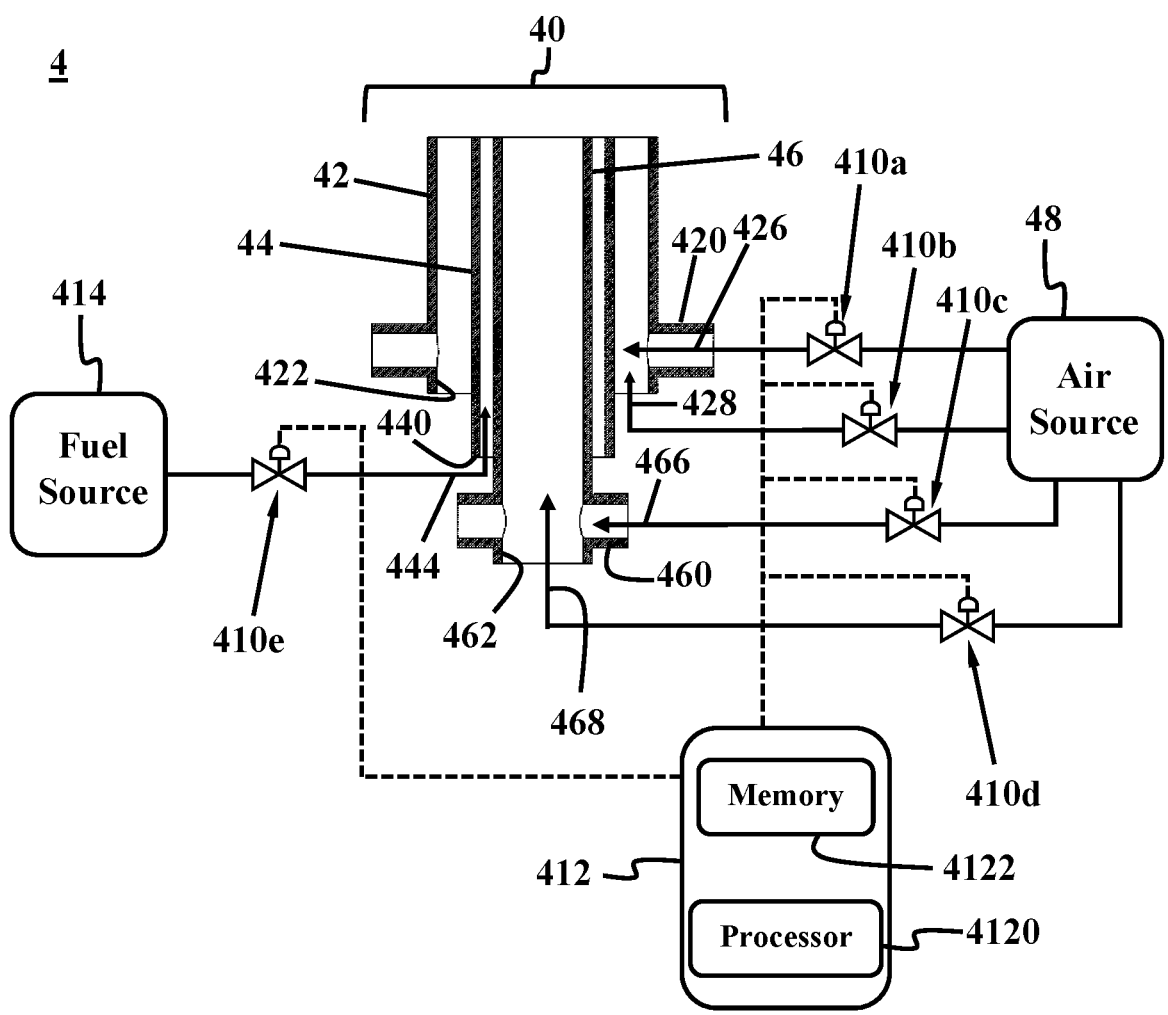
FIG. 4 illustrates a system for operating a double swirl burner, consistent with one or more exemplary embodiments of the present disclosure.

FIG. 4 illustrates a system 4 for operating a double swirl burner 40, consistent with one or more exemplary embodiments of the present disclosure. In an exemplary embodiment, double swirl burner 40 may be structurally and functionally similar to double swirl burner 10. In an exemplary embodiment, double swirl burner 40 may include an annular air nozzle 42 similar to annular air nozzle 12, an annular fuel nozzle 44 similar to annular fuel nozzle 14. Annular fuel nozzle 44 may be coaxially disposed within annular air nozzle 42. In an exemplary embodiment, double swirl burner 40 may further include a central air nozzle 46 similar to central air nozzle 16. Central air nozzle 46 may be coaxially disposed within annular fuel nozzle 44.

In an exemplary embodiment, annular air nozzle 42 may include a first inlet port 420 similar to first inlet port 120. In an exemplary embodiment, first inlet port 420 may be configured to allow for tangentially injecting a first airstream 426 into annular air nozzle 42. In an exemplary embodiment, annular air nozzle 42 may further include a first axial inlet 422 similar to first axial inlet 122. In an exemplary embodiment, first axial inlet 422 may be configured to allow for injecting a second air stream 428 into annular air nozzle 42. In an exemplary embodiment, central air nozzle 46 may include a second inlet port 460 similar to second inlet port 160. In an exemplary embodiment, second inlet port 460 may be configured to allow for tangentially injecting a third airstream 466 into central air nozzle 46. In an exemplary embodiment, central air nozzle 46 may further include a second axial inlet 462 similar to second axial inlet 162. In an exemplary embodiment, second axial inlet 462 may be configured to allow for injecting a fourth airstream 468 into annular air nozzle 46. In an exemplary embodiment, annular fuel nozzle 44 may include an axial fuel inlet 440 similar to axial fuel inlet 140. In an exemplary embodiment, axial fuel inlet 440 may be configured to allow for injecting an axial fuel stream 444 into annular fuel nozzle 44 along a centerline of annular fuel nozzle 44.

In an exemplary embodiment, first inlet port 420 and first axial inlet 422 may fluidically connect an interior of annular air nozzle 42 to a pressurized air source 48. In an exemplary embodiment, pressurized air source 48 may provide first airstream 426 that may be injected into annular air nozzle 42 via first inlet port 420. A mass flow rate of first airstream 426 may be controlled by a first control valve 410a. In an exemplary embodiment, pressurized air source 48 may further provide second airstream 428 that may be injected into annular air nozzle 42 via first axial inlet 422. A mass flow rate of second airstream 428 may be controlled by a second control valve 410b.

In an exemplary embodiment, double swirl burner system 4 may further include a control unit 412 that may be functionally coupled to first control valve 410a and second control valve 410b. In an exemplary embodiment, control unit 412 may be configured to adjust a first swirl number for annular air nozzle 42 by manipulating mass flow rates of first airstream 426 and second airstream 428 utilizing first control valve 410a and second control valve 410b, respectively. As used herein, the first swirl number for annular air nozzle 42 may be defined as a ratio between an axial momentum of the airstream within annular air nozzle 42 and a radial momentum of the airstream within annular air nozzle 42. This ratio of momentums may be changed and adjusted by changing the mass flow rates of first airstream 426 and second airstream 428, as was discussed above with respect to FIG. 4.

In an exemplary embodiment, second inlet port 460 and second axial inlet 462 may fluidically connect an interior of central air nozzle 46 to pressurized air source 48. In an exemplary embodiment, pressurized air source 48 may provide third airstream 466 that may be injected into central air nozzle 46 via second inlet port 460. A mass flow rate of third airstream 466 may be controlled by a third control valve 410c. In an exemplary embodiment, pressurized air source 48 may further provide fourth airstream 468 that may be injected into central air nozzle 46 via second axial inlet 462. A mass flow rate of fourth airstream 468 may be controlled by a fourth control valve 410d.

In an exemplary embodiment, control unit 412 may further be coupled to third control valve 410c and fourth control valve 410d. In an exemplary embodiment, control unit 412 may be configured to adjust a second swirl number for central air nozzle 46 by manipulating mass flow rates of third airstream 466 and fourth airstream 468 utilizing third control valve 410c and fourth control valve 410d, respectively. As used herein, the second swirl number for central air nozzle 46 may be defined as a ratio between an axial momentum of the airstream within central air nozzle 46 and a radial momentum of the airstream within central air nozzle 46. This ratio of momentums may be changed and adjusted by changing the mass flow rates of third airstream 426 and fourth airstream 428

In an exemplary embodiment, axial fuel inlet 440 may fluidically connect an interior of annular fuel nozzle 44 to a pressurized fuel source 414. In an exemplary embodiment, pressurized fuel source 414 may provide axial fuel stream 444 that may be injected into annular fuel nozzle 44 via axial fuel inlet 440. A mass flow rate of axial fuel stream 444 may be controlled by a fifth control valve 410e. In an exemplary embodiment, control unit 412 may further be functionally coupled to fifth control valve 410e. In an exemplary embodiment, control unit 412 may be configured to adjust a mass flow rate of axial fuel stream 444 by manipulating fifth control valve 410e. In an exemplary embodiment, all conventional gas fuels may be utilized in double swirl burner system 4 with a flow rate between 1 and 500 $Lmin^{-1}$.

The flame structure that may be generated at an exit plane of double swirl burner 40 may be changed and adjusted by changing and adjusting at least one of mass flow rate ratio between discharge airstreams from annular air nozzle 42 and central air nozzle 46, mass flow rate of fuel stream discharged from annular fuel nozzle 44, the first swirl number, and the second swirl number. In an exemplary embodiment, double swirl burner system 4 may allow for dynamically controlling the flame structure at the exit of double swirl burner 40. This dynamic control over the flame structure may be possible by dynamically controlling the first, the second, the third, the fourth, and fuel flow rates utilizing control unit 412.

In an exemplary embodiment, control unit 412 may include a processor 4120 and a memory 4122 that may be coupled with the processor. In an exemplary embodiment, memory 4122 may include executable instructions to cause processor 4120 to adjust a mass flow rate of first airstream 426 by sending a control signal to first control valve 410a, adjust a mass flow rate of second airstream 468 by sending a control signal to second control valve 410b, adjust a mass flow rate of third airstream 466 by sending a signal to third control valve 410c, adjust a mass flow rate of fourth airstream 468 by sending a control signal to fourth control valve 410d, and adjust a mass flow rate of fuel stream 444 by sending a signal to the fifth control valve 410e. As used herein, a control signal may refer to a signal sent by control unit 412 to any of control valves 410a-e to open or close control valves 410a-e.

In an exemplary embodiment, flow rates of first airstream 426, second airstream 468, third airstream 466, and fourth airstream 468 may be adjusted at up to approximately 1000 $Lmin^{-1}$. In an exemplary embodiment, the first and the second swirl numbers may be adjusted between 0 and 2, by adjusting mass flowrates of first airstream 426, second airstream 468, third airstream 466, and fourth airstream 468 utilizing control unit 412.

It should be understood that although, annular nozzle and central nozzle are referred to herein as annular air nozzle and central air nozzle, double swirl burner system 4 may allow for injecting air or fuel streams into annular air nozzle 42 and central air nozzle 46. In other words, double swirl burner system 4 may further be configured to swirl a fuel stream as well by, for example, injecting a fuel stream into either central air nozzle 46 or annular air nozzle 42.

Figure 5A:
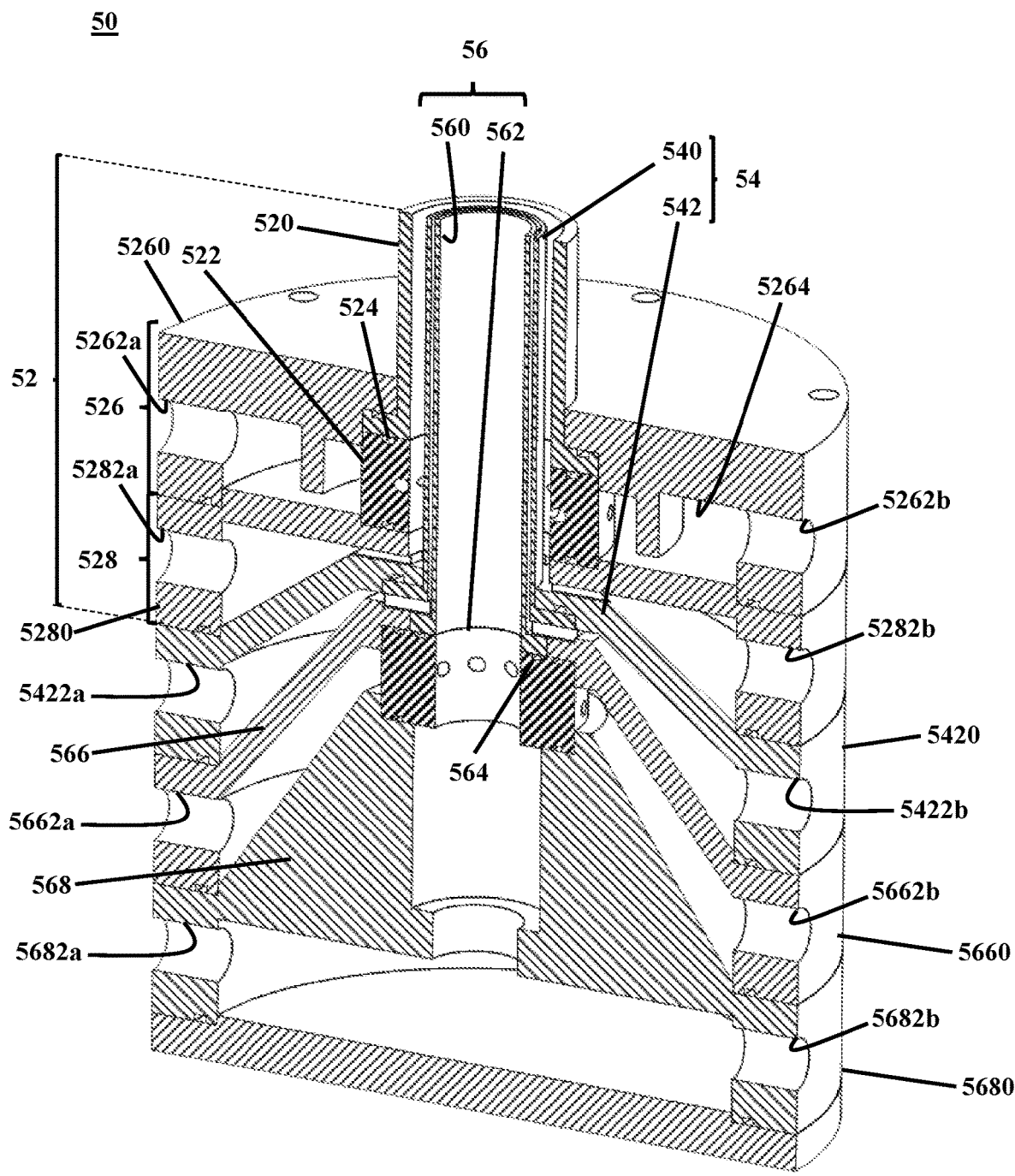
FIG. 5A illustrates a sectional perspective view of a double swirl burner, consistent with one or more exemplary embodiments of the present disclosure.

FIG. 5A illustrates a sectional perspective view of a double swirl burner 50, consistent with one or more exemplary embodiments of the present disclosure. In an exemplary embodiment, double swirl burner 50 may be functionally similar to double swirl burner 10. In an exemplary embodiment, double swirl burner 50 may include an annular nozzle assembly 52, an annular fuel nozzle assembly 54, and a central nozzle assembly 56.

In an exemplary embodiment, annular nozzle assembly 52 may include a first nozzle 520 and a first aerodynamic swirl generator 522 positioned immediately below and tightly connected to first nozzle 520. As used herein, tightly connected to may refer to coupling first nozzle 520 and first aerodynamic swirl generator 522 in an airtight manner. To this end, sealing members such as O-rings 524 may be placed between first nozzle 520 and first aerodynamic swirl generator 522. In an exemplary embodiment, annular nozzle assembly 52 may further include a first air channel assembly 526 that may be connected in fluid communication with first aerodynamic swirl generator 522. In an exemplary embodiment, first air channel assembly 526 may include an annular member 5260 with two diametrically opposed inlet ports 5262a-b located on the periphery of annular member 5260. In an exemplary embodiment, two diametrically opposed inlet ports 5262a-b may be configured to supply pressurized air to first aerodynamic swirl generator 522. In an exemplary embodiment, first aerodynamic swirl generator 522 may be tightly mounted within first air channel assembly 526 in fluid communication with hollow interior 5264 of first air channel assembly 526.

In an exemplary embodiment, annular nozzle assembly 52 may further include a second air channel assembly 528 that may be connected in fluid communication with first nozzle 520. In an exemplary embodiment, second air channel assembly 528 may include an annular member 5280 with two diametrically opposed inlet ports 5282a-b located on the periphery of annular member 5280. In an exemplary embodiment, two diametrically opposed inlet ports 5282a-b may be configured to axially supply pressurized air to first nozzle 520.

Referring to FIGS. 4 and 5A, in an exemplary embodiment, opposed inlet ports 5262a-b and opposed inlet ports 5282a-b may fluidically connect an interior of first nozzle 520 to pressurized air source 48. In an exemplary embodiment, pressurized air source 48 may provide first airstream 426 that may be injected into first nozzle 520 via opposed inlet ports 5262a-b and through first aerodynamic swirl generator 522. In an exemplary embodiment, pressurized air source 48 may further provide second airstream 428 that may be axially injected into annular air nozzle 42 via opposed inlet ports 5282a-b.

Figure 5B:
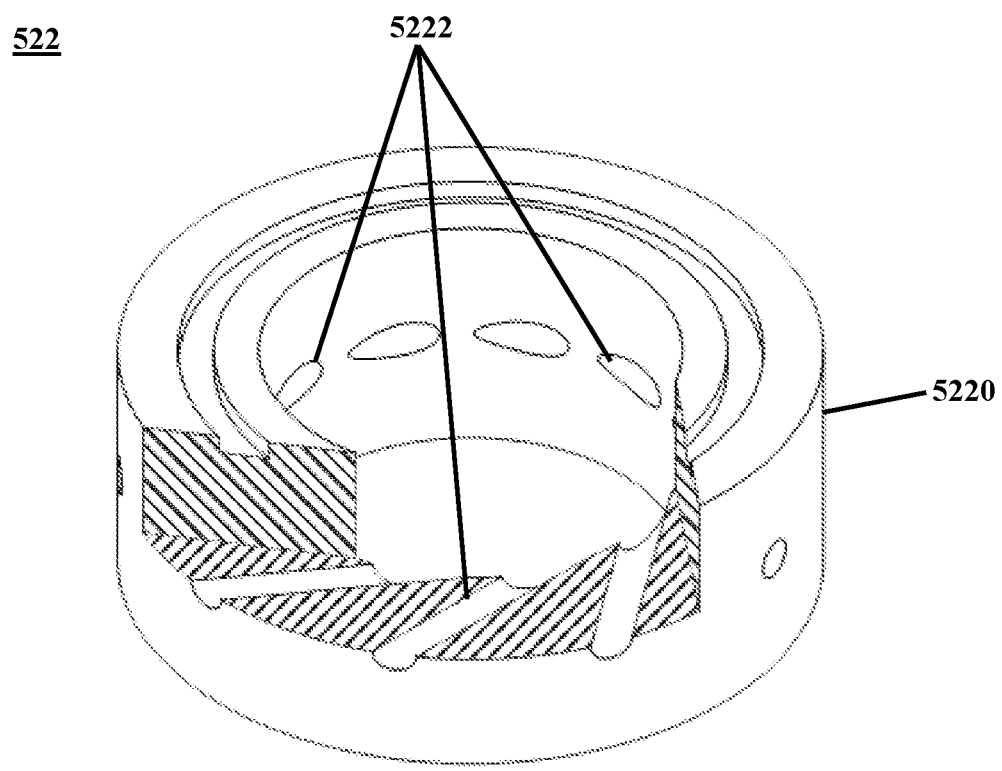
FIG. 5B illustrates a sectional perspective view of first aerodynamic swirl generator 522, consistent with one or more exemplary embodiments of the present disclosure.
Figure 5C:
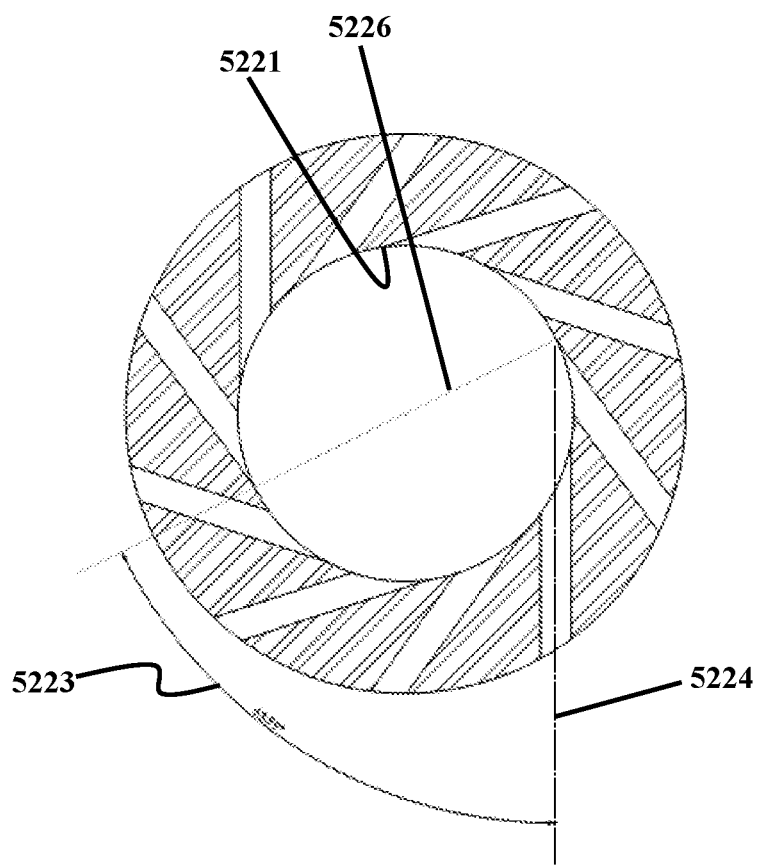
FIG. 5C illustrates a sectional top view of a first aerodynamic swirl generator, consistent with one or more exemplary embodiments of the present disclosure.

FIG. 5B illustrates a sectional perspective view of first aerodynamic swirl generator 522, consistent with one or more exemplary embodiments of the present disclosure. FIG. 5C illustrates a sectional top-view of first aerodynamic swirl generator 522, consistent with one or more exemplary embodiments of the present disclosure. In an exemplary embodiment, first aerodynamic swirl generator 522 may include an open-ended annular body 5220. In an exemplary embodiment, annular body 5220 may include a first plurality of inlet ports 5222 that may be located on the periphery of annular body 5220. In an exemplary embodiment, each of first plurality of inlet ports 5222 may open into annular body 5220 such that a pressurized air stream being injected through each of first plurality of inlet ports 5222 may tangentially enter annular body 5220. In an exemplary embodiment, each of first plurality of inlet ports 5222 may be a cylindrical hole that may be oriented such that an angle between a centerline of each of first plurality of inlet ports 5222 and a diameter of circular cross-section of annular body 5220 that intersects an exemplary centerline on a periphery of circular cross-section 5221 of annular body 5220 may be at most 64°. For example, an angle 5223 between centerline 5224 and diameter 5226 that intersects centerline 5224 on the periphery of the circular cross-section of annular body 5220 may be 63.99°. In an exemplary embodiment, such orientation of each of first plurality of inlet ports 5222 may allow for injecting tangential streams of air into annular body 5220 and thereby generating a swirling flow within first nozzle 520.

Referring to FIG. 5A, in an exemplary embodiment, annular fuel nozzle assembly 54 may include a fuel nozzle 540 connected in fluid communication to a fuel channel assembly 542. In an exemplary embodiment, fuel channel assembly 542 may include an annular body 5420 with two diametrically opposed fuel ports 5422a-b located on the periphery of annular body 5420 and configured to supply fuel to fuel nozzle 540.

Figure 5D:
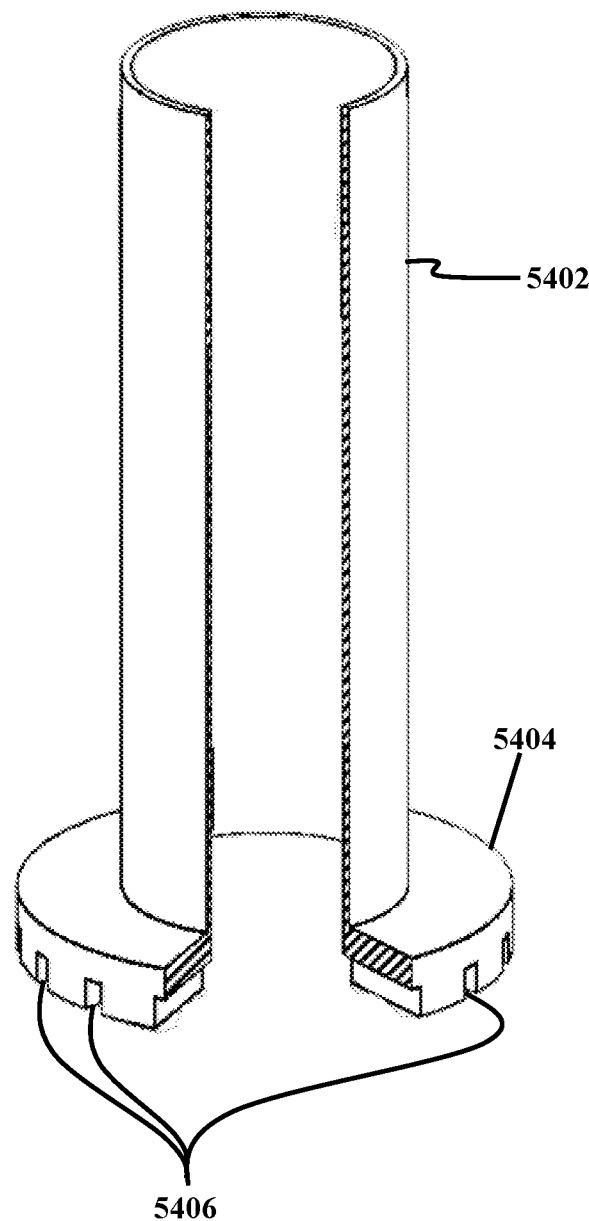
FIG. 5D illustrates a sectional perspective view of a fuel nozzle, consistent with one or more exemplary embodiments of the present disclosure.

FIG. 5D illustrates a sectional perspective view of fuel nozzle 540, consistent with one or more exemplary embodiments of the present disclosure. In an exemplary embodiment, fuel nozzle 540 may include a hollow cylindrical body 5402 integrally formed above an inlet portion 5404. In an exemplary embodiment, inlet portion 5404 may be an annular part with a larger diameter than that of hollow cylindrical body 5402 that may include a plurality of radially extended channels 5406 on a periphery of inlet portion 5404. Plurality of radially extended channels 5406 may fluidically connect an interior of hollow cylindrical body 5402 to fuel channel assembly 542.

Referring to FIGS. 4, 5A, and 5D, in an exemplary embodiment, fuel ports 5422a-b may fluidically connect an interior of annular fuel nozzle assembly 54 to pressurized fuel source 414. In an exemplary embodiment, pressurized fuel source 414 may provide axial fuel stream 444 that may be injected into fuel channel assembly 542. Axial fuel stream 444 may reach the interior of fuel nozzle 540 through plurality of radially extended channels 5406.

Referring to FIG. 5A, in an exemplary embodiment, central nozzle assembly 56 may include a central nozzle 560 and a second aerodynamic swirl generator 562 positioned immediately below and tightly connected to central nozzle 560. As used herein, tightly connected to may refer to coupling central nozzle 560 and second aerodynamic swirl generator 562 in an airtight manner. To this end, sealing members such as O-rings 564 may be placed between central nozzle 560 and second aerodynamic swirl generator 562. In an exemplary embodiment, central nozzle assembly 56 may further include a third air channel assembly 566 that may be connected in fluid communication with second aerodynamic swirl generator 562. In an exemplary embodiment, third air channel assembly 566 may include an annular member 5660 with two diametrically opposed inlet ports 5662a-b located on the periphery of annular member 5660 and configured to supply pressurized air to second aerodynamic swirl generator 562. In an exemplary embodiment, second aerodynamic swirl generator 562 may be tightly mounted within third air channel assembly 566 in fluid communication with hollow interior 5664 of third air channel assembly 566.

In an exemplary embodiment, central nozzle assembly 56 may further include a fourth air channel assembly 568 that may be connected in fluid communication with central nozzle 560. In an exemplary embodiment, fourth air channel assembly 568 may include an annular member 5680 with two diametrically opposed inlet ports 5682a-b located on the periphery of annular member 5680. In an exemplary embodiment, two diametrically opposed inlet ports 5682a-b may be configured to axially supply pressurized air to central nozzle 560.

Referring to FIGS. 4 and 5A, in an exemplary embodiment, opposed inlet ports 5662a-b and opposed inlet ports 5682a-b may fluidically connect an interior of central nozzle 560 to pressurized air source 48. In an exemplary embodiment, pressurized air source 48 may provide first airstream 426 that may be injected into central nozzle 560 via opposed inlet ports 5662a-b and through second aerodynamic swirl generator 562. In an exemplary embodiment, pressurized air source 48 may further provide second airstream 428 that may be axially injected into central nozzle 560 via opposed inlet ports 5682a-b.

Figure 5E:
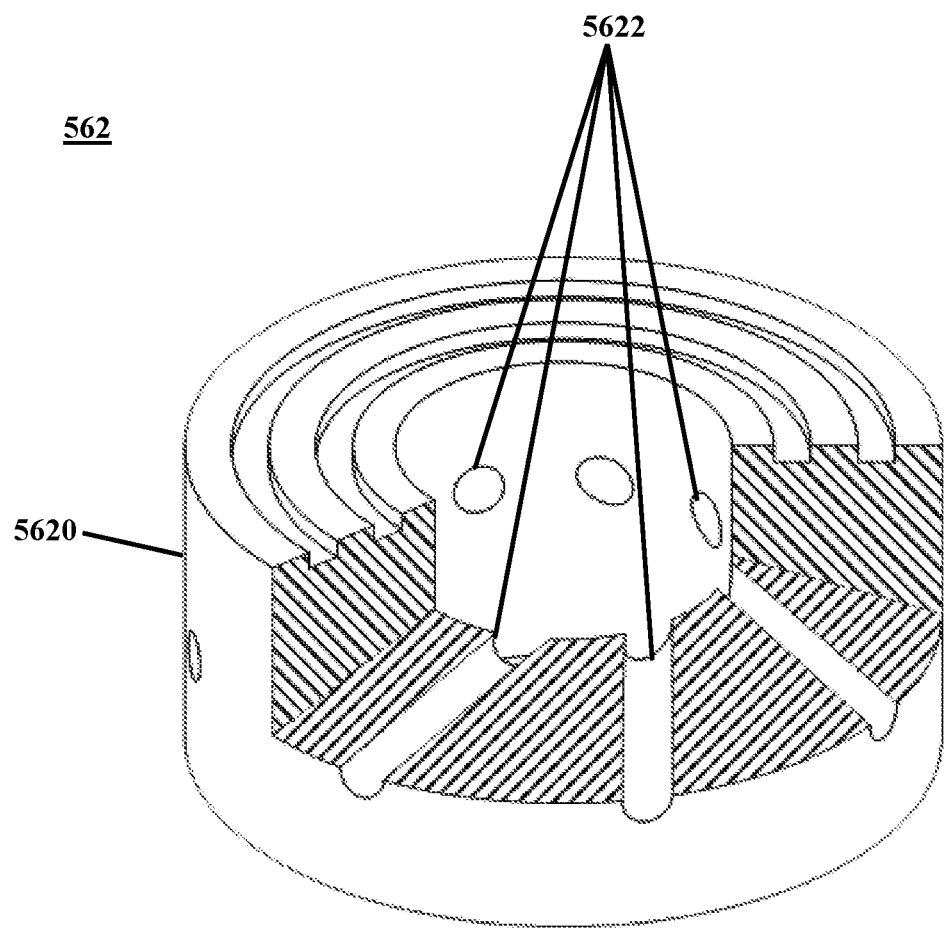
FIG. 5E illustrates a sectional perspective view of a second aerodynamic swirl generator, consistent with one or more exemplary embodiments of the present disclosure.
Figure 5F:
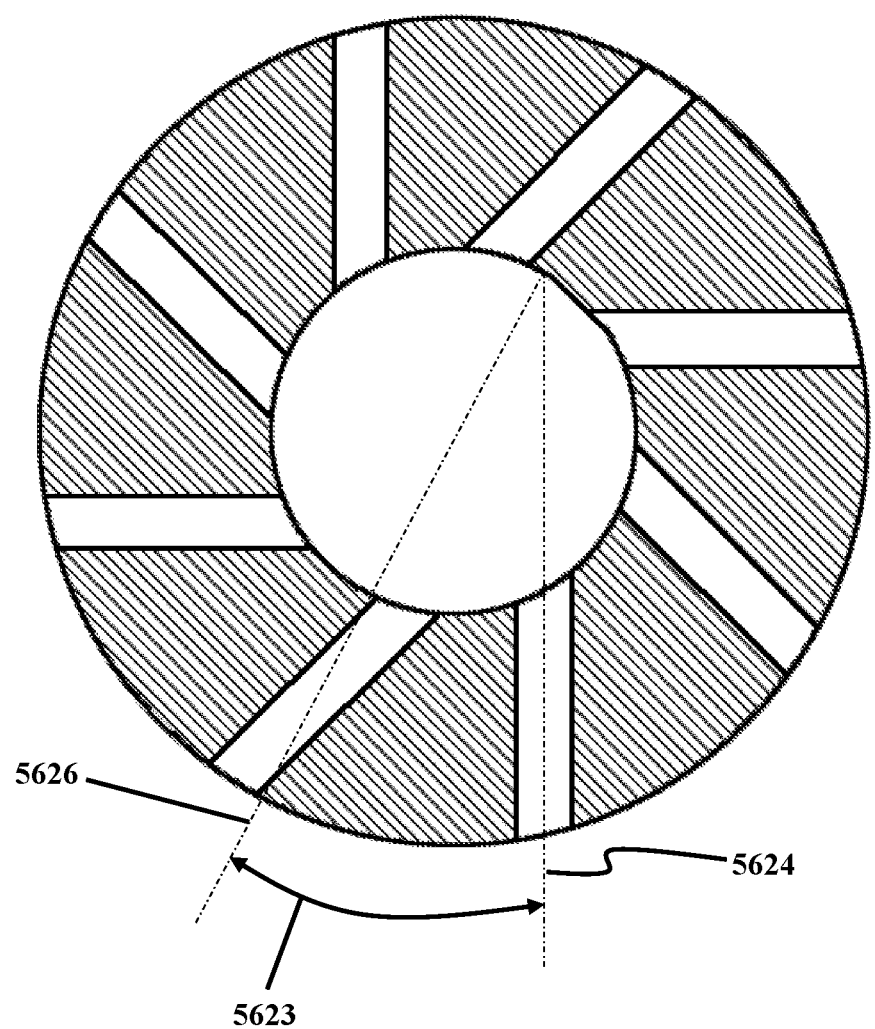
FIG. 5F illustrates a sectional top view of a second aerodynamic swirl generator, consistent with one or more exemplary embodiments of the present disclosure.

FIG. 5E illustrates a sectional perspective view of second aerodynamic swirl generator 562, consistent with one or more exemplary embodiments of the present disclosure. FIG. 5F illustrates a sectional top-view of second aerodynamic swirl generator 562, consistent with one or more exemplary embodiments of the present disclosure. In an exemplary embodiment, second aerodynamic swirl generator 562 may include an open-ended annular body 5620. In an exemplary embodiment, annular body 5620 may include a second plurality of inlet ports 5622 that may be located on the periphery of annular body 5620. In an exemplary embodiment, each of second plurality of inlet ports 5622 may open into annular body 5620 such that a pressurized air stream being injected through each of second plurality of inlet ports 5622 may tangentially enter annular body 5620. In an exemplary embodiment, each of second plurality of inlet ports 5622 may be a cylindrical hole that may be oriented such that an angle between a centerline of each of second plurality of inlet ports 5622 and a diameter of circular cross-section of annular body 5620 that intersects the centerline on a periphery of circular cross-section 5621 of annular body 5620 may be at most 30°. For example, an angle 5623 between centerline 5624 and diameter 5626 that intersects centerline 5624 on the periphery of the circular cross-section of annular body 5620 may be 30°. In an exemplary embodiment, such orientation of each of second plurality of inlet ports 5622 may allow for injecting tangential streams of air into annular body 5620 and thereby generating a swirling flow within central nozzle 560.

Figure 5G:
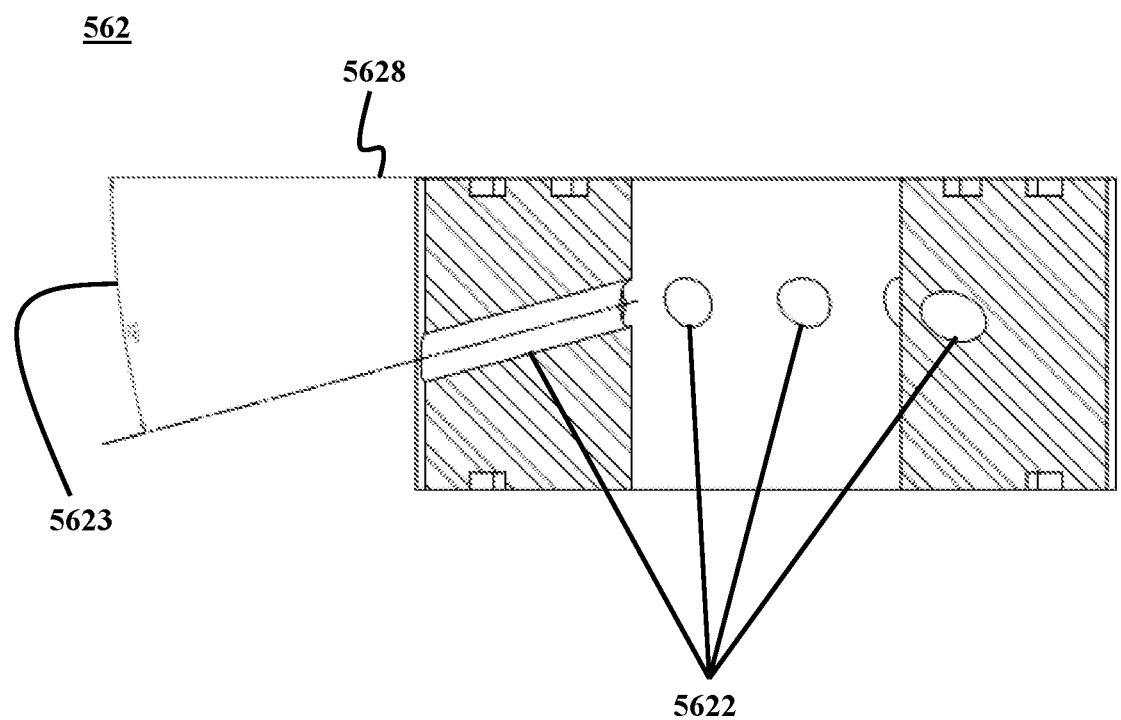
FIG. 5G illustrates a sectional side view of a second aerodynamic swirl generator, consistent with one or more exemplary embodiments of the present disclosure.

FIG. 5G illustrates a sectional side-view of second aerodynamic swirl generator 562, consistent with one or more exemplary embodiments of the present disclosure. In an exemplary embodiment, each of second plurality of inlet ports 5622 may be inclined at an angle 5623 of at most 15° downwards off horizontal plane 5628.

Figure 6A:
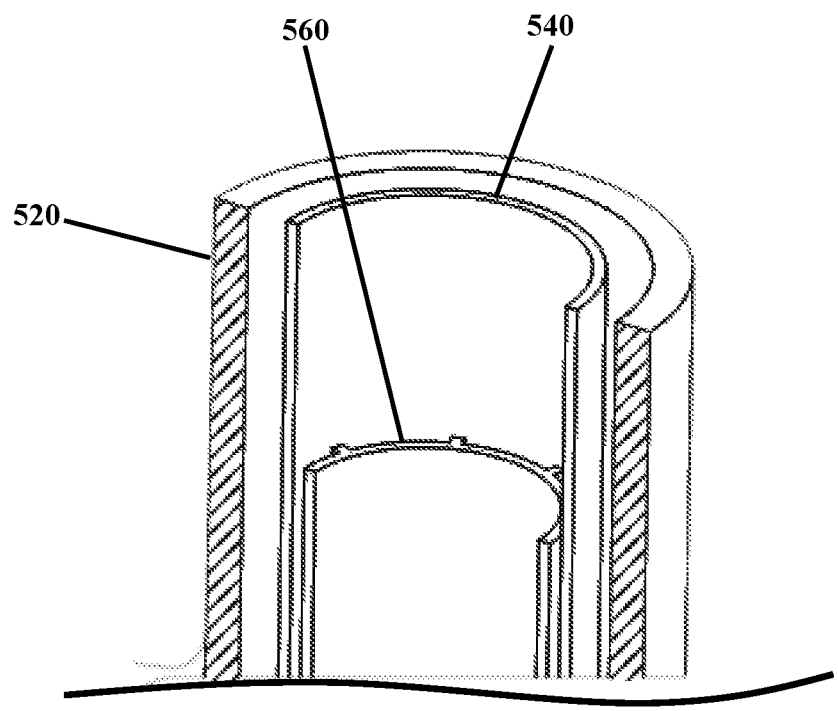
FIG. 6A illustrates a sectional perspective view of a first nozzle, an annular fuel nozzle, and a central nozzle, consistent with one or more exemplary embodiments of the present disclosure.
Figure 6B:
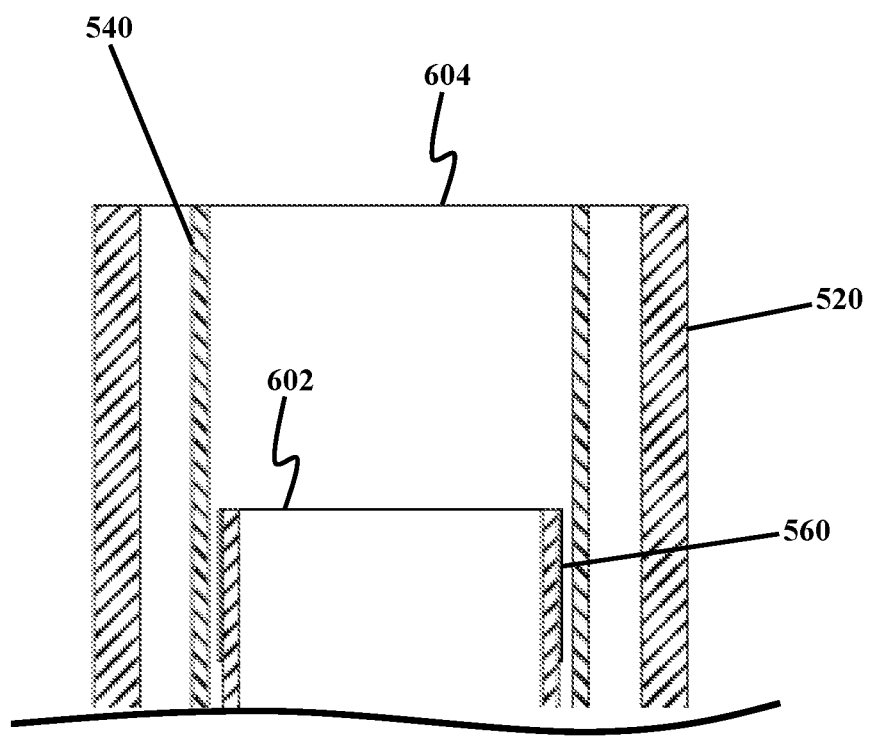
FIG. 6B illustrates a sectional side view of a first nozzle, an annular fuel nozzle, and a central nozzle, consistent with one or more exemplary embodiments of the present disclosure.
Figure 8:
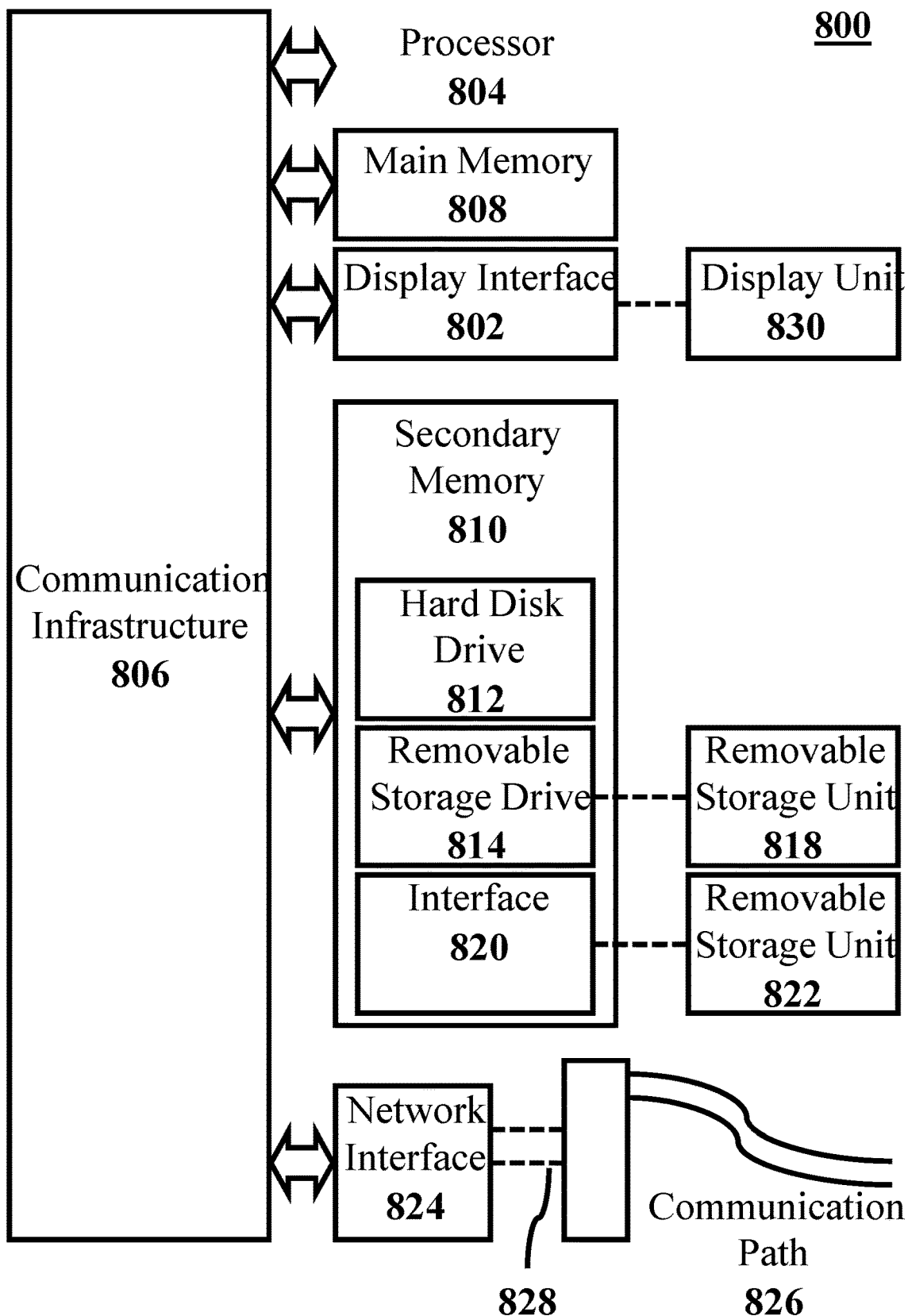
FIG. 8 shows a high-level functional block diagram of a computer system, consistent with one or more exemplary embodiments of the present disclosure.

FIG. 6A illustrates a sectional perspective view of first nozzle 520, annular fuel nozzle 540, and central nozzle 560, consistent with one or more exemplary embodiments of the present disclosure. FIG. 6B illustrates a sectional side-view of first nozzle 520, annular fuel nozzle 540, and central nozzle 560, consistent with one or more exemplary embodiments of the present disclosure. In an exemplary embodiment, an exit plane 602 of central nozzle 560 may be upstream of an exit plane 604 of annular fuel nozzle 540, while exit planes of first nozzle 520 and annular fuel nozzle 540 may be superimposed. In exemplary embodiments, exit plane 602 of central nozzle 560 being upstream of exit plane 604 of annular fuel nozzle 540 may allow for a premix between the swirling air stream discharged from central nozzle 560 with the fuel stream discharged from annular fuel nozzle 540.

FIG. 7 illustrates a flowchart of a method 70 for operating a double swirl burner, consistent with one or more exemplary embodiments of the present disclosure. In an exemplary embodiment, method 70 may include a step 702 of injecting a first airstream into an annular air nozzle, the first stream injected tangential to a circular cross-section of the annular air nozzle, a step 704 of injecting a second air stream into the annular air nozzle, the second air stream injected axially along a centerline of the annular air nozzle, a step 706 of injecting a fuel stream into an annular fuel nozzle disposed coaxially within the annular air nozzle, the fuel stream injected axially along a centerline of the annular fuel nozzle, a step 708 of injecting a third airstream into a central air nozzle coaxially disposed within the annular fuel nozzle, the third stream injected tangential to a circular cross-section of the central air nozzle, and a step 710 of injecting a fourth air stream into the central air nozzle, the fourth air stream injected axially along a centerline of the central nozzle. In an exemplary embodiment, method 70 may be implemented by double swirl burner system 4 of FIG. 4.

Referring to FIGS. 4 and 7, in an exemplary embodiment, method 70 may be utilized for operating a double swirl burner similar to double swirl burner 40. In an exemplary embodiment, step 702 of injecting the first airstream into an annular air nozzle may include injecting first airstream 426 into annular air nozzle 42, where first airstream 426 may be injected tangent to the circular cross-section of annular air nozzle 42 via first inlet port 420.

In an exemplary embodiment, step 704 of injecting a second air stream into the annular air nozzle may include injecting second air stream 428 into annular air nozzle 42, where second air stream 428 may be injected axially along a centerline of the annular air nozzle 42.

In an exemplary embodiment, step 706 of injecting a fuel stream into an annular fuel nozzle disposed coaxially within the annular air nozzle may include injecting fuel stream 444 into annular fuel nozzle 44, where fuel stream 444 may be injected axially along a centerline of the annular fuel nozzle 44.

In an exemplary embodiment, step 708 of injecting the third airstream into a central air nozzle coaxially disposed within the annular fuel nozzle may include injecting third airstream 466 into central air nozzle 46, where third airstream 466 may be injected tangent to the circular cross-section of central air nozzle 46 via second inlet port 460.

In an exemplary embodiment, step 710 of injecting a fourth air stream into the central air nozzle may include injecting fourth airstream 468 into central air nozzle 46, where fourth airstream 468 may be injected axially along a centerline of central air nozzle 46.

In an exemplary embodiment, method 70 may further include a step of adjusting a first swirl intensity within the annular air nozzle by changing a ratio of a mass flow rate of the first airstream to a mass flow rate of the second air stream. In an exemplary embodiment, changing the ratio of the mass flow rate of the first airstream to the mass flow rate of the second air stream may include changing the mass flow rate of the first airstream and the mass flow rate of the second air stream. For example, control unit 412 may be configured to adjust the first swirl number within annular air nozzle 42 by manipulating mass flow rates of first airstream 426 and second airstream 428 utilizing first control valve 410a and second control valve 410b, respectively. In other words, memory 4122 may include executable instructions to cause processor 4120 to adjust a mass flow rate of first airstream 426 by sending a control signal to first control valve 410a, adjust a mass flow rate of second airstream 468 by sending a control signal to second control valve 410b.

In an exemplary embodiment, method 70 may further include a step of adjusting a second swirl intensity within the central air nozzle by changing a ratio of a mass flow rate of the third airstream to a mass flow rate of the fourth air stream. In an exemplary embodiment, changing the ratio of the mass flow rate of the third airstream to the mass flow rate of the fourth air stream may include changing the mass flow rate of the third airstream and the mass flow rate of the fourth air stream. For example, control unit 412 may be configured to adjust the second swirl number for central air nozzle 46 by manipulating mass flow rates of third airstream 466 and fourth airstream 468 utilizing third control valve 410c and fourth control valve 410d, respectively. In other words, memory 4122 may include executable instructions to cause processor 4120 to adjust a mass flow rate of third airstream 466 by sending a signal to third control valve 410c, adjust a mass flow rate of fourth airstream 468 by sending a control signal to fourth control valve 410d.

FIG. 5 shows an example computer system 800 in which an embodiment of the present invention, or portions thereof, may be implemented as computer-readable code, consistent with exemplary embodiments of the present disclosure. For example, method 70 may be implemented in computer system 800 using hardware, software, firmware, tangible computer-readable media having instructions stored thereon, or a combination thereof and may be implemented in one or more computer systems or other processing systems.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, control unit 412 may be a computing device having at least one processor device such as processor 4122 and a memory such as memory 4120. Such a computing device may be used to implement the above-described embodiments. A processor device may be a single processor, a plurality of processors, or combinations thereof. Processor devices may have one or more processor "cores."

An embodiment of the invention is described in terms of this example computer system 800. After reading this description, it will become apparent to a person skilled in the relevant art how to implement the invention using other computer systems and/or computer architectures. Although operations may be described as a sequential process, some of the operations may, in fact, be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

In an exemplary embodiment, computer system 800 may include a processor device 804 that may be similar to processor 4120. In an exemplary embodiment, processor device 804 may be a special purpose or a general-purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 may be connected to a communication infrastructure 806, for example, a bus, message queue, network, or multi-core message-passing scheme.

In an exemplary embodiment, computer system 800 may include a display interface 802, for example, a video connector, to transfer data to a display unit 830, for example, a monitor. Computer system 800 may also include a main memory 808 similar to memory 4122. In an exemplary embodiment, main memory 808 may include, for example, random access memory (RAM). Computer system 800 may further include a secondary memory 810. Secondary memory 810 may include, for example, a hard disk drive 812, and a removable storage drive 814. Removable storage drive 814 may include a floppy disk drive, a magnetic tape drive, an optical disk drive, a flash memory, or the like. Removable storage drive 814 may read from and/or write to a removable storage unit 818 in a well-known manner. Removable storage unit 818 may include a floppy disk, a magnetic tape, an optical disk, etc., which may be read by and written to by removable storage drive 814. As will be appreciated by persons skilled in the relevant art, removable storage unit 818 may include a computer-usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot, and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Computer program medium and computer-usable medium may also refer to memories, such as main memory 808 and secondary memory 810, which may be memory semiconductors (e.g., DRAMs, etc.).

Computer programs (also called computer control logic) are stored in main memory 808 and/or secondary memory 810. Computer programs may also be received via communications interface 824. Such computer programs, when executed, enable computer system 800 to implement different embodiments of the present disclosure as discussed herein. In particular, the computer programs, when executed, enable processor device 804 to implement the processes of the present disclosure, such as the operations in method 70. Accordingly, such computer programs represent controllers of computer system 800. Where an exemplary embodiment of method 70 is implemented using the software, the software may be stored in a computer program product and loaded into computer system 800 using removable storage drive 814, interface 820, and hard disk drive 812, or communications interface 824.

Embodiments of the present disclosure also may be directed to computer program products including software stored on any useable computer medium. Such software, when executed in one or more data processing devices, causes a data processing device to operate as described herein. An embodiment of the present disclosure may employ any computer useable or readable medium. Examples of computer useable mediums include, but are not limited to, primary storage devices (e.g., any type of random-access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and discussed in the present disclosure may be implemented together in any suitable combination. Accordingly, the implementations are not to be restricted except in light of the attached claims and their equivalents. Also, various modifications and changes may be made within the scope of the appended claims.

What is claimed is:

1. A double swirl burner, comprising:
   an annular air nozzle, the annular air nozzle comprising:
   at least one first inlet port on a peripheral wall of the annular air nozzle, the first inlet port configured to allow for tangentially injecting a first air stream into the annular air nozzle, the first air stream tangential to a circular cross-section of the annular air nozzle; and
   a first axial inlet configured to allow for axially injecting a second airstream into the annular air nozzle along a centerline of the annular air nozzle;
   an annular fuel nozzle coaxially disposed within the annular air nozzle, the annular fuel nozzle comprising an axial fuel inlet, the axial fuel inlet configured to allow for axially injecting a fuel stream along a centerline of the annular fuel nozzle; and
   a central air nozzle coaxially disposed within the annular fuel nozzle, the central air nozzle comprising:
   at least one second inlet port on a peripheral wall of the central air nozzle, the second inlet port configured to allow for tangentially injecting a third air stream into the central air nozzle, the third stream tangential to a circular cross-section of the central air nozzle; and
   a second axial inlet configured to allow for axially injecting a fourth air stream into the central air nozzle along a centerline of the central air nozzle.

2. The double swirl burner according to claim 1, wherein a centerline of the first inlet port, from a top-view, is tangential to a first imaginary circle, the first imaginary circle concentric with and equidistant from the circular cross-section of the annular air nozzle and the circular cross-section of the annular fuel nozzle.

3. The double swirl burner according to claim 1, wherein a centerline of the first inlet port, from a top-view, is tangential to a first imaginary circle, the first imaginary circle comprising a locus of a point moved to be equidistant from an outer surface of the annular fuel nozzle and an inner surface of the annular air nozzle.

4. The double swirl burner according to claim 1, wherein a centerline of the second inlet port, from a top-view, is tangential to a second imaginary circle, the second imaginary circle concentric with the circular cross-section of the central nozzle, the second imaginary circle with a diameter half a diameter of the circular cross-section of the central nozzle.

5. The double swirl burner according to claim 1, wherein the central air nozzle comprises an annular nozzle with a length and a diameter, wherein a ratio of the length to the diameter is between 4 and 6.

6. The double swirl burner according to claim 5, wherein the annular air nozzle comprises a length of at most 60% of the length of the central air nozzle.

7. The double swirl burner according to claim 5, wherein the fuel nozzle comprises a length of at most 85% of the length of the central air nozzle.

8. The double swirl burner according to claim 1, wherein a cross-sectional area of the central air nozzle is equal to a cross-sectional air-passage area of the annular air nozzle.

9. The double swirl burner according to claim 1, wherein the central air nozzle further comprises a second axial air outlet downstream of the second inlet port, the second inlet port inclined at an angle of at most 15° downwards off a horizontal plane of the second axial air outlet.

10. The double swirl burner according to claim 1, wherein an interior of the annular air nozzle is fluidically connected via the first inlet port to a first air source, the first air source configured to provide the first air stream with a first flow rate, and wherein an interior of the annular air nozzle is fluidically connected via the first axial inlet to a second air source, the second air source configured to provide the second airstream with a second flow rate.

11. The double swirl burner according to claim 10, wherein an interior of the central air nozzle is fluidically connected via the second inlet port to a third air source, the third air source configured to provide the third air stream with a third flow rate, and wherein an interior of the central air nozzle is fluidically connected via the second axial inlet to a fourth air source, the fourth air source configured to provide the fourth air stream with a fourth flow rate.

12. The double swirl burner according to claim 11, wherein an interior of the annular fuel nozzle is fluidically connected via the axial fuel inlet to a fuel source, the fuel source configured to provide the fuel stream with an adjustable flow rate.

13. The double swirl burner according to claim 1, wherein annular fuel nozzle further comprises an axial fuel outlet, the axial fuel inlet at a distance of at most 85% of a length of the central air nozzle upstream of the axial fuel outlet.

14. The double swirl burner according to claim 1, wherein:
the annular air nozzle further comprises a first air outlet downstream of the first axial inlet,
the annular fuel nozzle further comprises an axial fuel outlet downstream of the axial fuel inlet,
the central air nozzle further comprises a second air outlet downstream of the second axial inlet, and
the first air outlet, the axial fuel outlet, and the second air outlet lie flush against each other.

15. The double swirl burner according to claim 1, wherein:
the annular air nozzle further comprises a first air outlet downstream of the first axial inlet,
the annular fuel nozzle further comprises an axial fuel outlet downstream of the axial fuel inlet,
the central air nozzle further comprises a second air outlet downstream of the second axial inlet, and
the first air outlet and the axial fuel outlet lie flush again each other, the second air outlet positioned upstream of the first air outlet and the axial fuel outlet.

16. The double swirl burner according to claim 1, wherein the at least one first inlet port connected to a pressurized air source via a first control valve, the first axial inlet connected to the pressurized air source via a second control valve, the at least one second inlet port connected to the pressurized air source via a third control valve, the second axial inlet connected to the pressurized air source via a fourth control valve, and the axial fuel inlet connected to a pressurized fuel source via a fifth control valve, the double swirl burner further comprising:
a controller coupled with the first control valve, the second control valve, the third control valve, the fourth control valve, and the fifth control valve, the controller configured to manipulate mass flow rates of the first airstream, the second airstream, the third airstream, the fourth airstream, and the axial fuel stream utilizing the first control valve, the second control valve, the third control valve, the fourth control valve, and the fifth control valve, respectively.

17. The double swirl burner according to claim 16, wherein the controller comprises:
one or more processors; and
a memory coupled with the processor, the memory configured to store executable instructions to cause the processor to:
adjust a mass flow rate of the first airstream by sending a signal to the first control valve;
adjust a mass flow rate of the second airstream by sending a signal to the second control valve;
adjust a mass flow rate of the third airstream by sending a signal to the third control valve;
adjust a mass flow rate of the fourth airstream by sending a signal to the fourth control valve; and
adjust a mass flow rate of the fuel stream by sending a signal to the fifth control valve.

18. A method for operating a double swirl burner, the method comprising:
injecting a first airstream into an annular air nozzle, the first stream injected tangent to a circular cross-section of the annular air nozzle;
injecting a second air stream into the annular air nozzle, the second air stream injected axially along a centerline of the annular air nozzle;
injecting a fuel stream into an annular fuel nozzle disposed coaxially within the annular air nozzle, the fuel stream injected axially along a centerline of the annular fuel nozzle;
injecting a third airstream into a central air nozzle coaxially disposed within the annular fuel nozzle, the third stream injected tangent to a circular cross-section of the central air nozzle; and
injecting a fourth air stream into the central air nozzle, the fourth air stream injected axially along a centerline of the central nozzle.

19. The method according to claim 18, wherein injecting the first airstream into the annular air nozzle comprises injecting the first airstream into the annular nozzle via at least one first inlet port through a peripheral wall of the annular air nozzle, a centerline of the first inlet port, from a top-view, is tangential to a first imaginary circle, the first imaginary circle comprising a locus of a point moved to be equidistant from an outer surface of the annular fuel nozzle and an inner surface of the annular air nozzle.

20. The method according to claim 18, injecting the third airstream into the central air nozzle comprises injecting the third airstream into the central nozzle via at least one second inlet port through a peripheral wall of the central air nozzle, a centerline of the second inlet port, from a top-view, is tangential to a second imaginary circle, the second imaginary circle concentric with the circular cross-section of the central nozzle, the second imaginary circle with a diameter half a diameter of the circular cross-section of the central nozzle.

\* \* \* \* \*